United States Patent
Yamazaki

(10) Patent No.: US 8,193,925 B2
(45) Date of Patent: *Jun. 5, 2012

(54) DISPLAY DEVICE AND VEHICLE

(75) Inventor: Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,779

(22) Filed: Aug. 8, 2011

(65) Prior Publication Data

US 2012/0033075 A1 Feb. 9, 2012

Related U.S. Application Data

(63) Continuation of application No. 12/502,446, filed on Jul. 14, 2009, now Pat. No. 7,994,903, which is a continuation of application No. 11/673,673, filed on Feb. 12, 2007, now Pat. No. 7,561,033, which is a continuation of application No. 10/016,224, filed on Nov. 1, 2001, now Pat. No. 7,176,790.

(30) Foreign Application Priority Data

Nov. 6, 2000 (JP) .................................. 2000-337193
Sep. 26, 2001 (JP) .................................. 2001-294343

(51) Int. Cl.
*B60Q 1/00* (2006.01)
(52) U.S. Cl. ........ 340/438; 340/437; 340/901; 340/937; 345/76; 345/92; 257/60; 257/71; 359/601
(58) Field of Classification Search .......... 340/435–441, 340/425.5, 426.1–430, 901, 903, 933; 345/76, 345/92; 257/71; 359/601
See application file for complete search history.

(56) References Cited

U.S. PATENT DOCUMENTS

| | | | |
|---|---|---|---|
| 4,910,591 A | 3/1990 | Petrossian et al. | |
| 5,027,104 A | 6/1991 | Reid | |
| 5,289,321 A | 2/1994 | Secor | |
| 5,303,205 A | 4/1994 | Gauthier et al. | |
| 5,396,084 A | 3/1995 | Matsumoto | |
| 5,619,370 A | 4/1997 | Guinosso | |
| 5,634,709 A | 6/1997 | Iwama | |
| 5,680,123 A | 10/1997 | Lee | |
| 5,793,308 A | 8/1998 | Rosinski et al. | |

(Continued)

FOREIGN PATENT DOCUMENTS

EP 0999595 A2 5/2000

(Continued)

*Primary Examiner* — Daniel Wu
*Assistant Examiner* — Son M Tang
(74) *Attorney, Agent, or Firm* — Fish & Richardson P.C.

(57) ABSTRACT

A vehicle has a display device which widens the field of view (visible area) reflected by a side mirror or a back mirror mounted on the vehicle. To enable a driver driving the vehicle to confirm safety even when it is difficult for the driver to visually recognize some of objects surrounding the vehicle, a liquid crystal display device or an EL display device is provided in the side mirror (door mirror), the back mirror (room mirror) or in an interior portion of the vehicle. A camera is mounted on the vehicle and an image from the camera is displayed on the display device. Further, information read from a sensor (distance measuring sensor) having the function of measuring the distance to another vehicle, and a sensor (impact sensor) having the function of sensing an externally applied impact force larger than a predetermined value is displayed on the display device.

19 Claims, 19 Drawing Sheets

U.S. PATENT DOCUMENTS

| | | | |
|---|---|---|---|
| 5,847,643 A | 12/1998 | Keith | |
| 5,949,107 A * | 9/1999 | Zhang | 257/347 |
| 5,956,181 A | 9/1999 | Lin | |
| 5,962,962 A | 10/1999 | Fujita et al. | |
| 6,124,647 A | 9/2000 | Marcus et al. | |
| 6,146,716 A | 11/2000 | Narang | |
| 6,246,070 B1 | 6/2001 | Yamazaki et al. | |
| 6,274,887 B1 | 8/2001 | Yamazaki et al. | |
| 6,376,333 B1 | 4/2002 | Yamazaki et al. | |
| 6,380,687 B1 | 4/2002 | Yamazaki | |
| 6,424,273 B1 | 7/2002 | Gutta et al. | |
| 6,462,722 B1 * | 10/2002 | Kimura et al. | 345/76 |
| 6,489,952 B1 | 12/2002 | Tanaka et al. | |
| 6,498,620 B2 | 12/2002 | Schofield et al. | |
| 6,509,832 B1 * | 1/2003 | Bauer et al. | 340/425.5 |
| 6,576,926 B1 | 6/2003 | Yamazaki et al. | |
| 6,618,033 B2 * | 9/2003 | Takafuji | 345/96 |
| 6,642,840 B2 | 11/2003 | Lang et al. | |
| 6,700,330 B2 | 3/2004 | Koyama | |
| 6,709,902 B2 | 3/2004 | Kitakado et al. | |
| 6,768,257 B1 | 7/2004 | Yamada et al. | |
| 6,781,293 B2 | 8/2004 | Cho | |
| 6,784,037 B2 | 8/2004 | Yamazaki et al. | |
| 6,812,912 B2 * | 11/2004 | Miyajima et al. | 345/92 |
| 6,839,045 B2 * | 1/2005 | Ozawa et al. | 345/92 |
| 6,847,487 B2 | 1/2005 | Burgner | |
| 6,885,148 B2 * | 4/2005 | Yudasaka | 313/504 |
| 6,894,608 B1 * | 5/2005 | Gunderson | 340/468 |
| 6,911,960 B1 | 6/2005 | Yokoyama | |
| 6,977,394 B2 | 12/2005 | Yamazaki et al. | |
| 7,176,068 B2 | 2/2007 | Kitakado et al. | |
| 7,400,365 B2 | 7/2008 | Gotoh et al. | |
| 7,417,253 B2 | 8/2008 | Yamazaki et al. | |
| 7,435,992 B2 * | 10/2008 | Choi et al. | 257/72 |
| 7,638,846 B2 | 12/2009 | Kitakado et al. | |
| 7,863,622 B2 | 1/2011 | Yamazaki et al. | |
| 2002/0014975 A1 | 2/2002 | Lang et al. | |
| 2002/0154007 A1 | 10/2002 | Yang | |
| 2007/0138475 A1 | 6/2007 | Kitakado et al. | |

FOREIGN PATENT DOCUMENTS

| | | |
|---|---|---|
| EP | 1065723 A2 | 1/2001 |
| EP | 2259314 A2 | 12/2010 |
| JP | 62103751 U | 7/1987 |
| JP | 07186832 A | 7/1995 |
| JP | 08258623 A | 10/1996 |
| JP | 3035262 U | 3/1997 |
| JP | 11291817 A | 10/1999 |
| JP | 2000208777 A | 7/2000 |
| JP | 2000275344 A | 10/2000 |

* cited by examiner

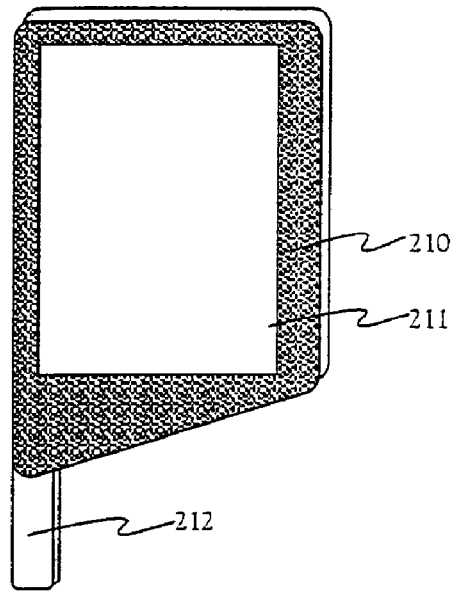
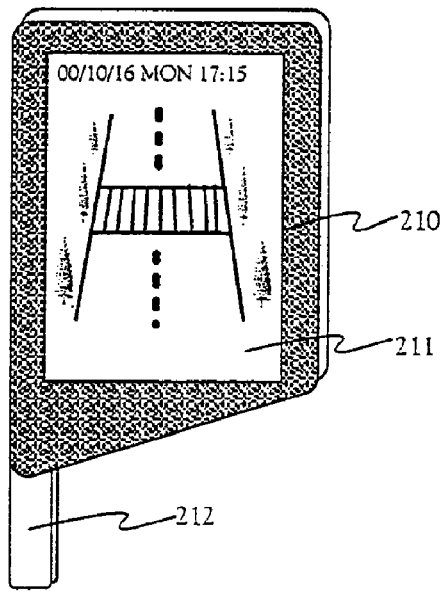
FIG. 5A              FIG. 5B
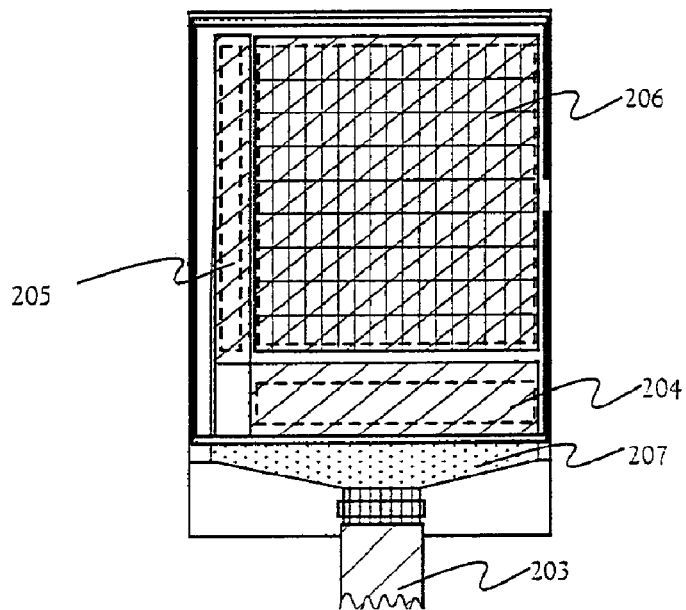
FIG. 5C

DISPLAY DEVICE AND VEHICLE

CROSS-REFERENCE TO RELATED APPLICATIONS

This application is a continuation of U.S. application Ser. No. 12/502,446, filed Jul. 14, 2009, now allowed, which is a continuation of U.S. application Ser. No. 11/673,673, filed Feb. 12, 2007, now U.S. Pat. No. 7,561,033, which is a continuation of U.S. application Ser. No. 10/016,224, filed Nov. 1, 2001, now U.S. Pat. No. 7,176,790, which claims the benefit of foreign priority applications filed in Japan as Serial No. 2000-337193 on Nov. 6, 2000 and Serial No. 2001-294343 on Sep. 26, 2001, all of which are incorporated by reference.

BACKGROUND OF THE INVENTION

1. Field of the Invention

The present invention generally relates to the structure and functions of vehicles for conveyance of people and goods, for towing of cars for conveyance of such objects, and for other special purposes. More particularly, the present invention relates to the structure and functions of side and back mirrors mounted on a vehicle.

2. Description of the Related Art

The term "vehicle" used in this specification refers to an electric train, a motor vehicle (e.g. car), or the like. Popularization of vehicles typified by motor vehicles is progressing because of their convenience.

A vehicle is provided with a side mirror (door mirror) and a back mirror (room mirror), which are used by a driver to confirm safety at the time of lane change, for example.

In this specification, "side mirror (door mirror)" refers to a mirror mounted on each side of the body of a vehicle to provide a driver with a rear view, and "back mirror (room mirror)" refers to a mirror which is mounted in or adjacent to a space containing the driver's seat to provide a driver with a rear view, and which is called a rearview mirror.

When a driver driving a vehicle on a road makes a lane change, it is difficult for the driver to perform necessary visual safety confirmation since the driver is in the forward-facing driving position. It is also difficult for the driver to visually perform safety confirmation when backing the vehicle into a carport since a place at the rear of the vehicle is in the driver's blind spot. In such situations, the driver drives the vehicle by relying on information obtained from scenes reflected by the side and back mirrors. However, the field of view (visible area) through each of the side and back mirrors is not sufficiently wide.

Under the above-described circumstances, the present invention aims to widen the fields of view through side and back mirrors.

It is important that a driver driving a vehicle on a road should recognize the distance to another vehicle in any direction to avoid an accident. However, drivers usually speed excessively when driving in the night. Further, drivers tend to speed excessively after moving from a highway to an ordinary road because of the influence of a sensation of high speed in driving on the highway. Traffic accidents occur frequently in such situations, because drivers do not always correctly recognize the vehicle speed and the distance to another vehicle in any direction.

Therefore, it is desirable that a driver who drives a vehicle and a fellow passenger be able to obtain necessary information such as the distance to another vehicle at any time.

SUMMARY OF THE INVENTION

The present invention has been made in view of the above-described circumstances, and an object of the present invention is to provide a vehicle having a camera and a sensor for enabling each of a driver who drives the vehicle and the fellow passengers to obtain necessary information.

Another object of the present invention is to provide a display device capable of displaying information read from a camera and a sensor, and a vehicle having such a display device.

According to the present invention, to enable a driver driving the vehicle to confirm safety even when it is difficult for the driver to visually recognize some of objects surrounding the vehicle, a liquid crystal display device or an EL display device is provided in a side mirror (door mirror), a back mirror (room mirror) or in an interior portion of the vehicle. In this specification, the liquid crystal display device and the EL display device will be collectively called "display device". Further, to enable the driver and a fellow passenger in the vehicle to obtain necessary information at any time, the vehicle is provided with a camera, a distance measuring sensor and an impact sensor and information obtained from the camera or each sensor is displayed on the display device.

The camera is provided on the vehicle at a position selected as desired, and an image obtained by the camera is displayed on the display device, thereby increasing the field of view obtained through the side mirror or the back mirror. The distance measuring sensor has the function of measuring the distance to another vehicle, and the impact sensor has the function of sensing an externally applied impact force larger than a predetermined value. Information read from each sensor is displayed on the display device.

An alarm device is also provided which includes an audio device, a display device and a control circuit. When the impact sensor outputs a danger signal, this signal is supplied to a CPU provided in the vehicle. The CPU supplied with the danger signal outputs a signal for indication of a danger to the display device and a signal for warning of the danger to the audio device. The display device gives an indication of the danger and the audio device gives a warning of the danger. Thus, the driver and the fellow passenger can be warned of the danger.

BRIEF DESCRIPTION OF THE DRAWINGS

FIGS. 5A, 5B, and 5C are diagrams showing an example of a side mirror used in the vehicle in accordance with the present invention;

DESCRIPTION OF THE PREFERRED EMBODIMENTS

[Embodiment Mode]

The term "vehicle" used in this specification refers to an electric train, a motor vehicle (e.g. car) or the like for conveyance of people and goods. A vehicle to which the present invention is applied has an energy source and a prime mover. The energy source is, for example, electricity or gasoline. The prime mover is a means for supplying necessary power for running of the vehicle, which is called an engine. The vehicle also has a body, a transmission, a braking system, a steering mechanism, a suspension, auxiliary equipment, and accessories in addition to the energy source and the prime mover.

Figure 1:
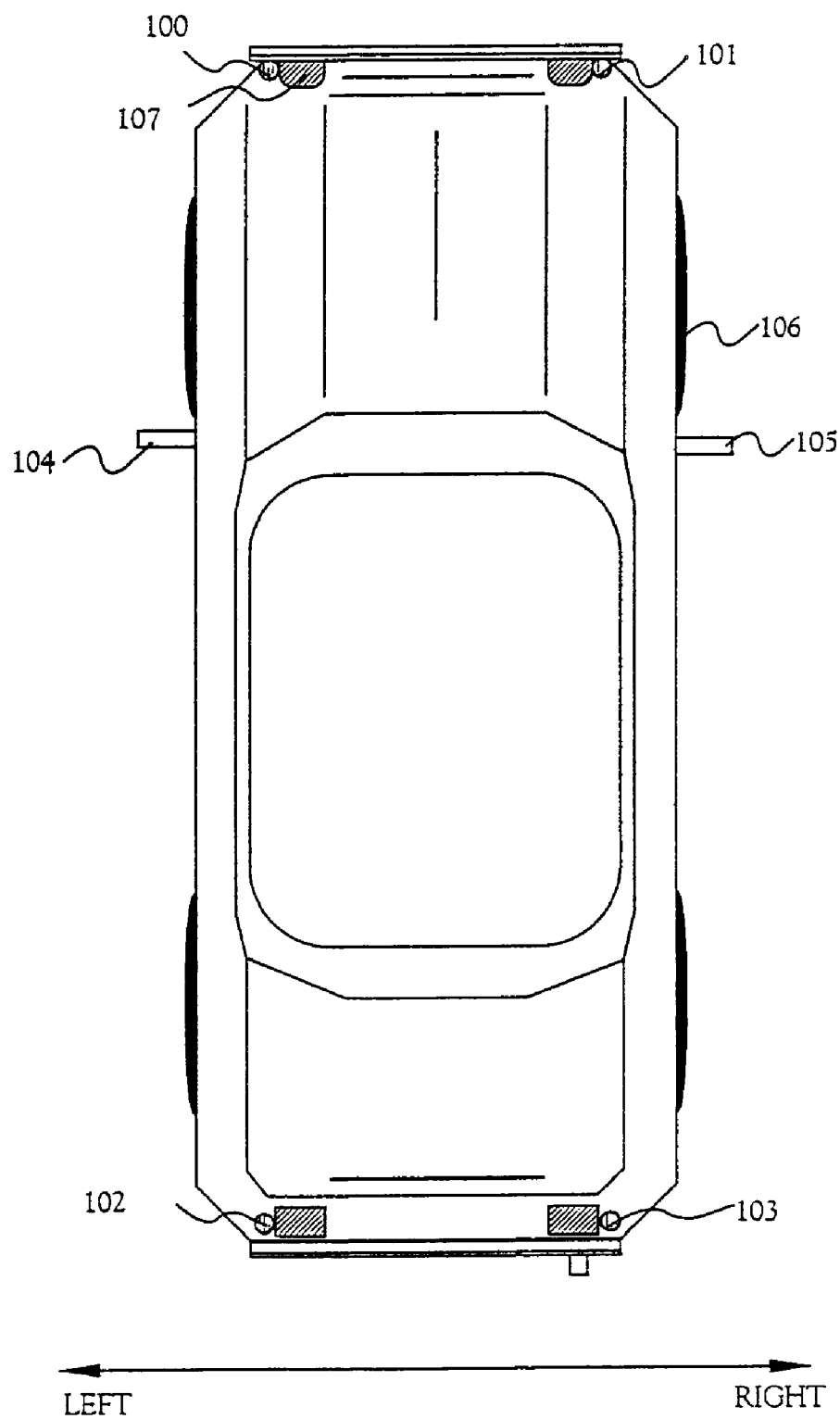
FIG. 1 is a top view of a vehicle of the present invention.

FIG. 1 is a top view of the vehicle. The vehicle illustrated in FIG. 1 is a motor vehicle (car). The vehicle travels forward and backward by using wheels. In this specification, a portion of the vehicle including one end of the vehicle in the forward traveling direction will be referred to as a front portion, and a portion of the vehicle including the other end will be referred to as a rear portion. The vehicle illustrated in FIG. 1 uses four wheels 106 for traveling. Two of the wheels 106 are provided in the front portion and the other two are provided in the rear portion. The vehicle also has our lights 107, i.e., two pairs of lights respectively provided on the front and rear portions. The lights 107 are used during running in the night, in a dark tunnel, or in other like situations.

Charge-coupled device (CCD) cameras are used in the vehicle illustrated in FIG. 1. A CCD camera provided on the left-hand side of the front portion with respect to the vehicle traveling direction will be referred to as a CCD left front (CLF) 100; a CCD camera on the right-hand side of the front portion, as a CCD right front (CRF) 101; a CCD camera on the left-hand side of the rear portion, as a CCD left rear (CLR) 102; and a CCD camera on the right-hand side of the rear portion, as a CCD right rear (CRR) 103.

In this embodiment mode, a camera of a so-called fisheye structure capable of image pickup in all directions through 360° is used as each of the CCD cameras CLF 100, CRF 101, CLR 102, and CRR 103 shown in FIG. 1. In this embodiment, two pair of these CCD cameras are respectively mounted on the front and rear portions of the vehicle and used to image objects surrounding the vehicle. The number of cameras and the placement of cameras are not limited to those described above. For example, a camera may be mounted on the roof of the vehicle. While the cameras used in this embodiment are CCD cameras, any other type of cameras may alternatively be used in the present invention as tong as the cameras are capable of image pickup.

The vehicle is provided with two side mirrors. The side mirror on the left-hand side will be referred to as a display left (DL) 104 and the side mirror on the right-hand side will be referred to as a display right (DR) 105. The side mirrors are mounted on the opposite sides of the body of the vehicle at positions indicated in FIG. 1, for example. Each of the DL 104 and the DL 105 has a display device which is a transmission-type liquid crystal display device, a reflection-type liquid crystal display device, or an electroluminescent (EL) display device.

Figure 2:
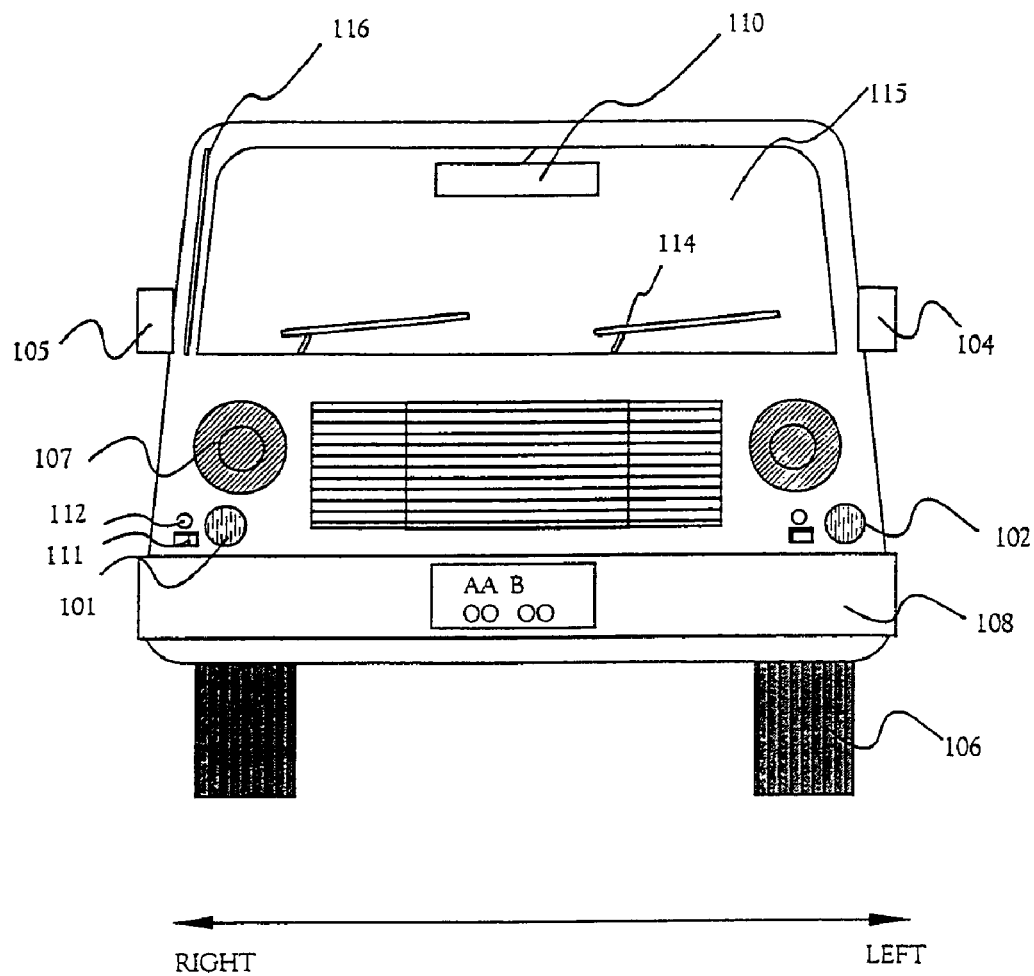
FIG. 2 is a front view of the vehicle shown of the present invention.

FIG. 2 shows a front view of the vehicle shown in FIG. 1. The DL 104 is provided on the left-hand side of the vehicle and the DR 105 is provided on the right-hand side of the vehicle. The lights 107, the wheels 106, the wipers 114, an antenna 116 are also provided.

The vehicle has a microphone 111 and a sensor 112 mounted on each side of the vehicle as shown in FIG. 2, although they are not shown in FIG. 1. The vehicle also has a back mirror (room mirror) mounted in the interior of the vehicle in such a position as to be superposed on a windshield 115 as viewed in FIG. 2. In this specification, the back mirror (room mirror) will be referred to as a back display (BD) 110. The BD 110 is mounted in or adjacent to a space containing the driver's seat in a place shown in FIG. 2, for example. The BD 110 is provided with a display device which is a transmission-type liquid crystal display device, a reflection-type liquid crystal display device, or an electroluminescent (EL) display device.

Figure 3:
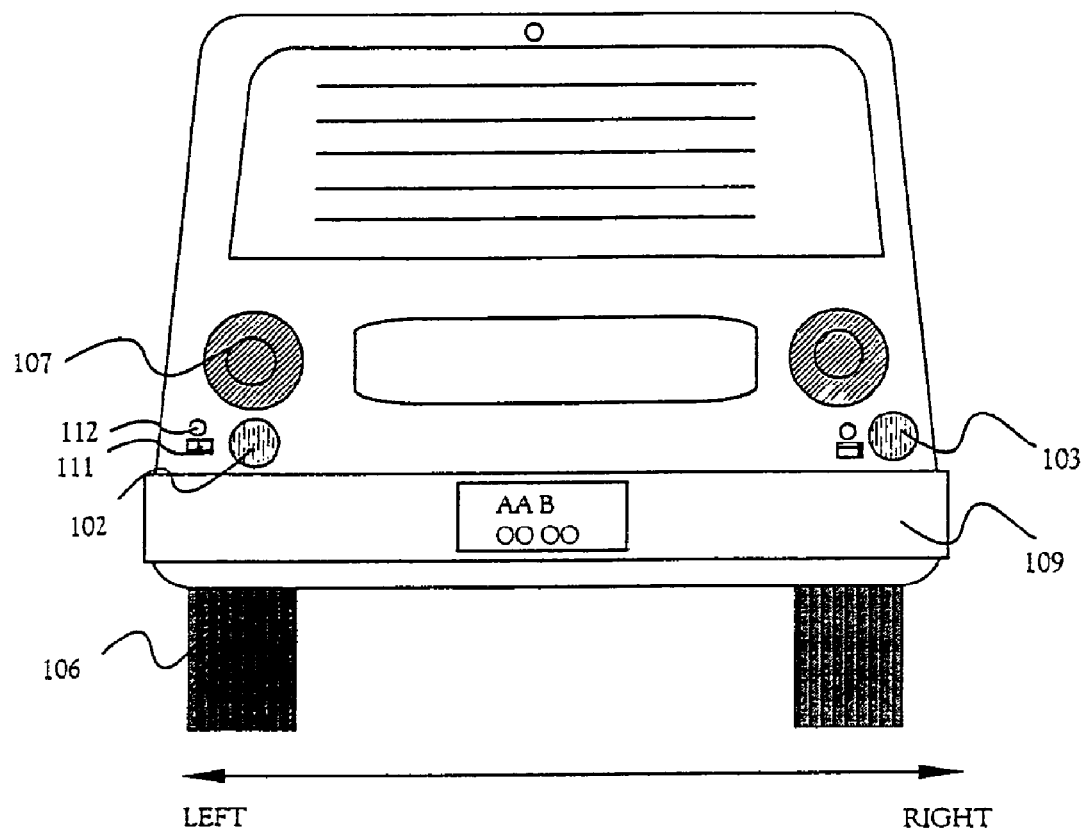
FIG. 3 is a rear view of the vehicle shown of the present invention.

FIG. 3 shows a rear view of the vehicle shown in FIG. 1. The vehicle has lights 107 and wheels 106. The vehicle also has CLR 102 mounted on the left-hand side, CRR 103 mounted on the right-hand side, and the microphone 111 and the sensor 112 mounted on each side of the vehicle.

Figure 4A:
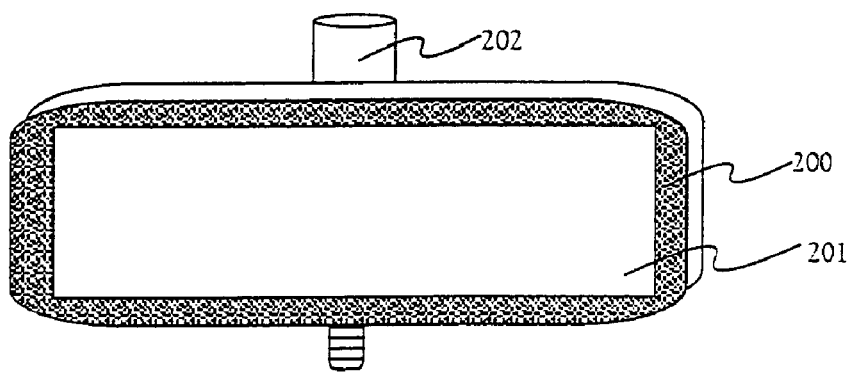
FIGS. 4A, 4B, and 4C are diagrams showing an example of a back mirror used in the vehicle in accordance with the present invention.
Figure 4B:
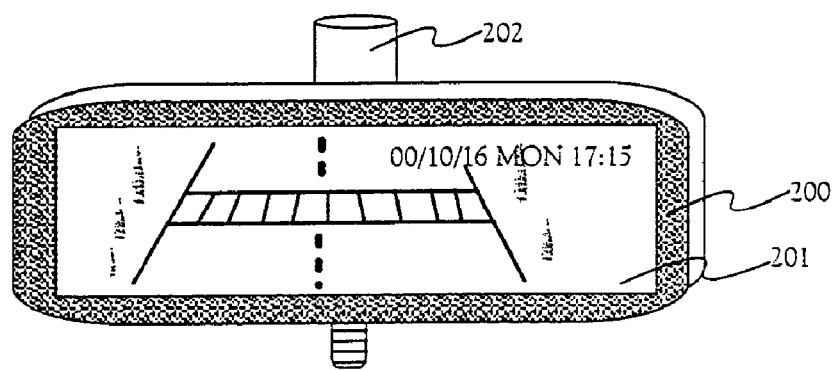
Figure 4C:
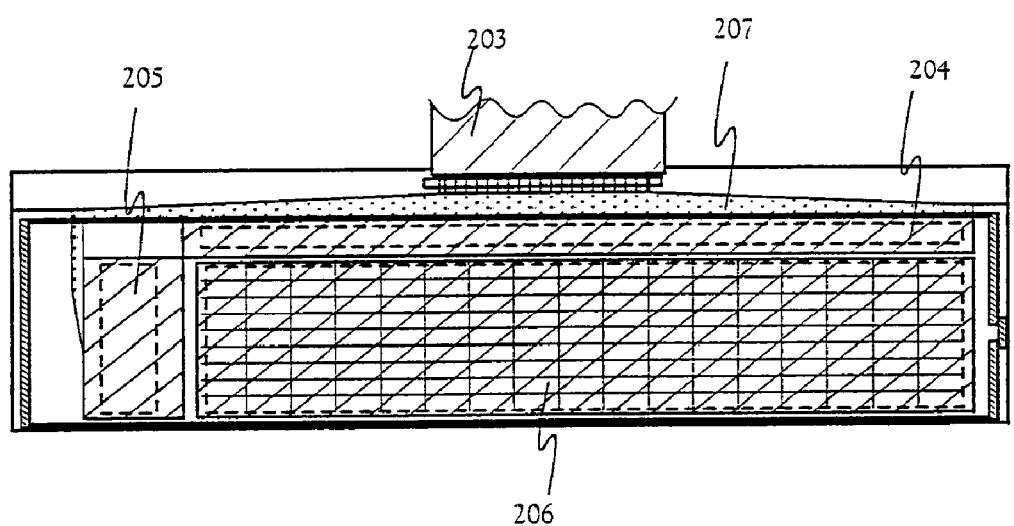

FIGS. 4A, 4B, and 4C are enlarged views of the BD 110 shown in FIG. 2, i.e., the back mirror (room mirror) provided in the interior of the vehicle. The BD 110 has a frame 200, a display device 201, and a connecting portion 202. The frame 200 is made of a material having sufficiently high strength and easily workable, e.g., a plastic. A drive circuit, wiring, etc., for the display device 201 are provided in an upper portion of the frame 200 and are connected to a central processing unit (CPU) or the like through the connecting portion 202. The connecting portion 202 is capable of protection of the wiring of the display device 201 connected to the CPU or the like.

FIG. 4A shows a state where no image is displayed on the display device 201. FIG. 4B shows a state where an image formed by the CCD camera is displayed on the display device 201. In the state shown in FIG. 4B, a date and a time are displayed by being superposed on the image. Information such as a date and a time can be displayed when necessary for a driver or a fellow passenger.

FIG. 4C shows a state of the BD 110 without the frame 200, and shows a pixel portion 206, a source signal linedrive circuit 204, a gate signal line drive circuit 205, an external input terminal to which a flexible printed circuit (FPC) 203 is attached, and wiring 207 for connecting the external input terminal and input portions of the circuits. The FPC 203 is connected to a CPU or the like through the connecting portion 202.

FIGS. 5A, 5B, and 5C are enlarged views of the side mirror DR 105 mounted on the right-hand side of the vehicle as viewed in FIG. 1. The side mirror DR 104 mounted on the left-hand side of the vehicle has a shape formed by horizontally flipping the shape of the side mirror DR 105. The DR 105 has a display device 211, a frame 210, and a connecting portion 212. The frame 210 is made of a material having sufficiently high strength and easily workable, e.g., a plastic. A drive circuit, wiring, etc., for the display device 211 are provided in a lower portion of the frame 210.

FIG. 5A shows a state where no image is displayed on the display device 211. FIG. 5B shows a state where an image formed by the CCD camera is displayed on the display device 211. In the state shown in FIG. 5B, a date and a time are displayed by being superposed on the image. Information such as a dare and a time can be displayed when necessary for a driver or a fellow passenger.

FIG. 5C shows a state of the DR 105 without the frame 210, and shows the pixel portion 206, the source signal line drive circuit 204, the gate signal line drive circuit 205, the external input terminal to which the flexible printed circuit (FPC) 203 is attached, and wiring 206 for connecting the external input terminal and input portions of the circuits. The FPC 203 is connected to the CPU through the connecting portion 212.

It is necessary that the display device in accordance with the present invention be formed in such a shape as to be capable of being accommodated in the side mirror or back mirror. FIGS. 4C and 5C illustrate only examples of the shape of the display device. The display device may have any shape if it can be accommodated in the frame. Further, FIGS. 4A-4C and 5A-5C respectively illustrate only examples of the shapes of the back mirror and the side mirror, and each of the back mirror and the side mirror may have any other shape.

Figure 6:
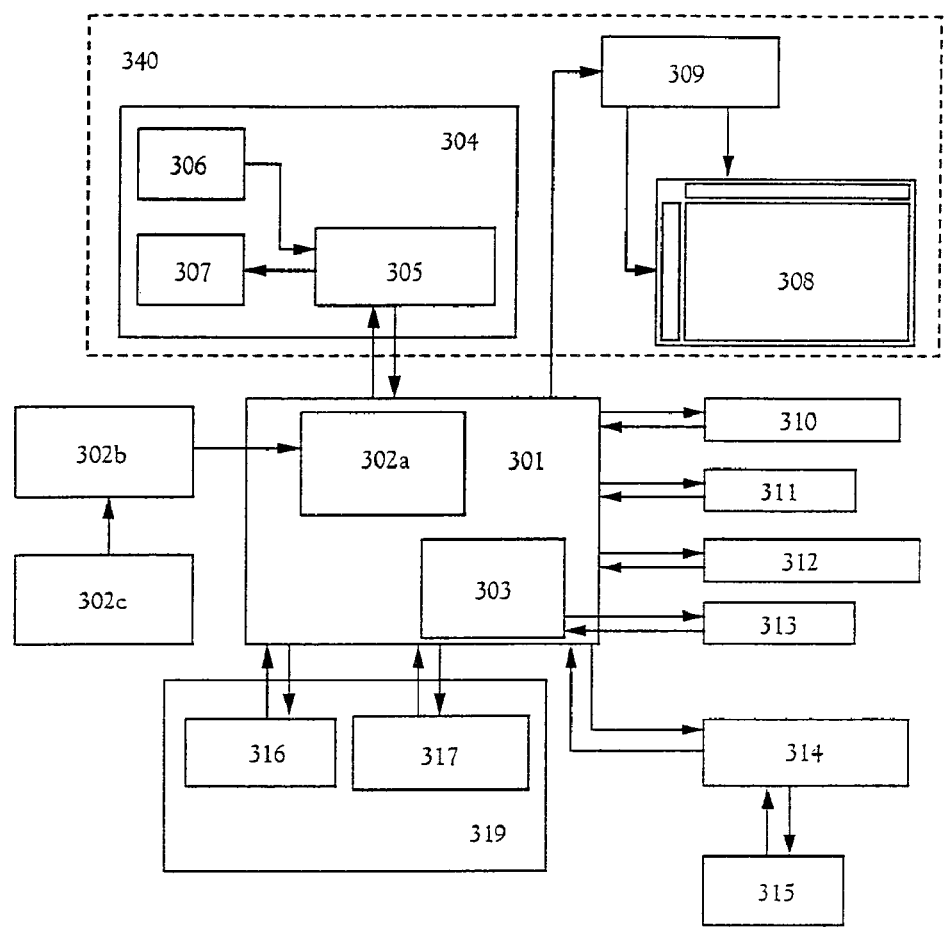
FIG. 6 is a block diagram of the system of the vehicle of the present invention.

FIG. 6 is a block diagram showing the structure of the vehicle and the display device used in the present invention.

A CPU 301 has an operating button interface section 302a and a video signal processing section 303. The system illustrated in FIG. 6 is configured so as to be centrally controlled by the CPU 301. Arrows in FIG. 6 indicate signal inputs and outputs.

Operating buttons 302c are provided in the interior of the vehicle in such a position that a user can easily operate it, for example, in a position closer to the driver's seat. When the operating buttons 302c are operated, a signal from the operating buttons 302c is input to the operating button interface section 302a through a button input signal processing circuit 302b. The input signal undergoes processing in the CPU 301 and predetermined signals are thereby output from the CPU 301 to devices such as an audio processing circuit 305 and a control circuit 309 or to a sensor 319.

An audio device 304 has the audio processing circuit 305, a microphone 306, and a speaker 307. The microphone 306 is provided outside the vehicle while the speaker 307 is provided in the interior of the vehicle. The microphone 306 converts sound (sound waves) from surroundings of the vehicle into an electrical signal and outputs the signal to the audio processing circuit 305. The audio processing circuit 305 outputs a vibrating signal to the speaker 307 to cause mechanical vibration in a diaphragm of the speaker 307, thereby producing sound (sound waves). The user can operate the audio device 304 through the CPU 301 by operating the operating buttons 302c. That is, the user can hear sounds from surroundings of the vehicle through the audio device 304 when necessary.

One or a plurality of cameras 315 are provided in one or a plurality of places in a vehicle 336 and are connected to the CPU 301 through an interface port 314. The user can operate each camera 315 by operating the operating buttons 302c when necessary. Information from the camera 315 is input to the CPU 301 through the interface port 314. Data processing is performed in the CPU 301 to display given information on the display device 308 through the control circuit 309. More specifically, information processed in the CPU 301 is output as a video signal (data signal) from the video signal processing section 303 to the control circuit 309. The control circuit 309 supplies the video signal and a clock signal (timing signal) to the display device 308. That is, the control circuit 309 has the function of dividing the video signal into data in correspondence with pixels of the display device 308, and the function of converting externally-input horizontal and vertical synchronizing signals into a signal for starting the drive circuit, a signal for controlling timing of forming alternating current in an internal power supply circuit, and a clock signal.

To the CPU 301 are also connected a video random access memory (VRAM) 313, a dynamic random access memory (DRAM) 311, a flash memory 312, and a memory card 310. The CPU 301 is provided in the vehicle 336 and accommodated in a sturdy heat-resistant box. It is preferred that the CPU 301 be mounted in a place in the vehicle where variation in temperature is comparatively small, such as the lower portion of the driver's seat.

The sensors 319 comprise an impact sensor 316 and a distance measuring sensor 317. The user can operate the impact sensor 316 and the distance measuring sensor 317 through the CPU 301 by the operating buttons 302c.

The impact sensor 316 will be described with reference to FIG. 7. One or a plurality of impact sensors 316 are provided in one or a plurality of places in the vehicle 336. Each impact sensor 316 senses an externally-applied impact force larger than a predetermined value and outputs a danger signal (impact signal) to the CPU 301 when detecting such a force.

Figure 7:
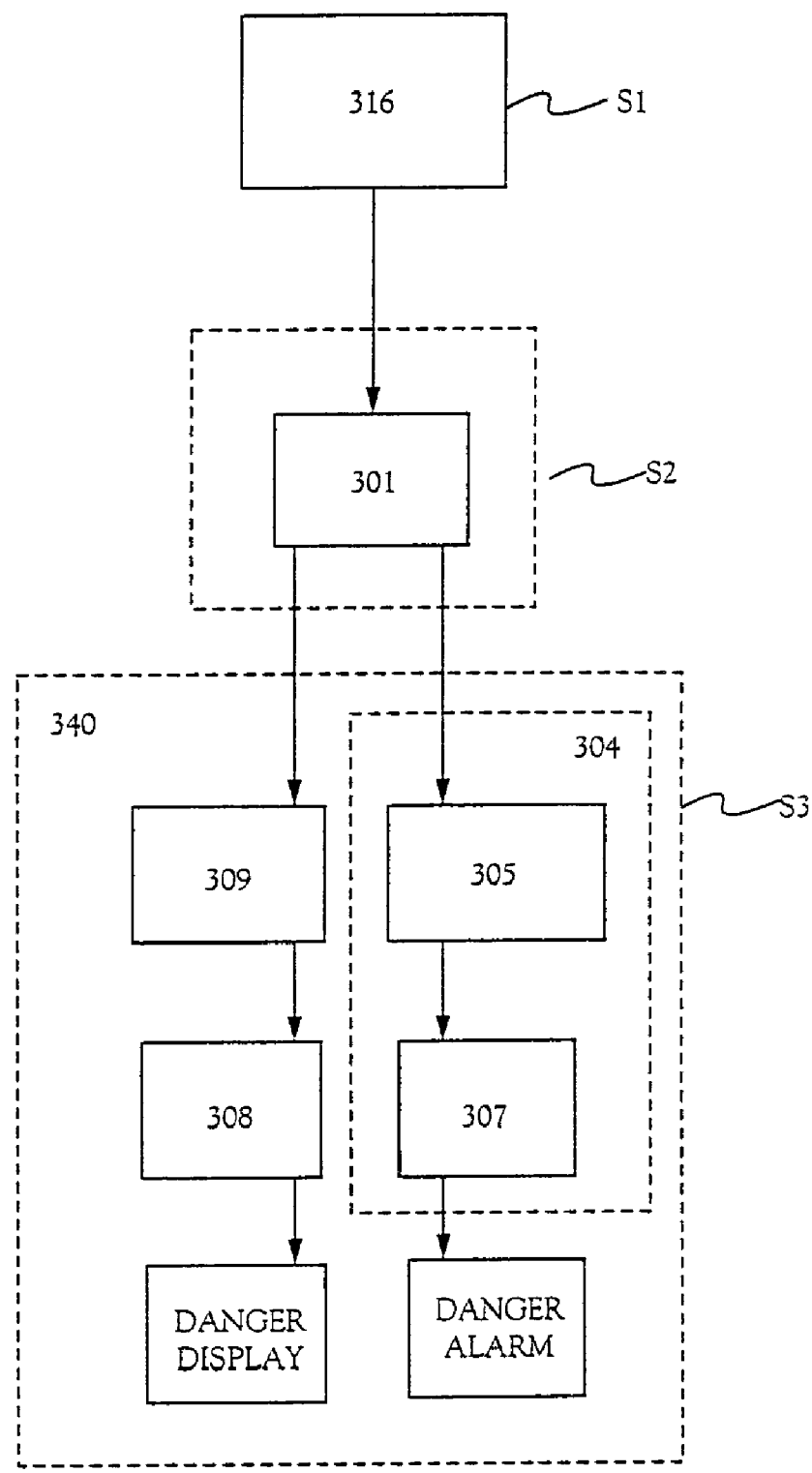
FIG. 7 is a flowchart of a process using an impact sensor of the present invention.

In FIG. 7, S1 to S3 represent lapses of time, and arrows represent signal inputs and outputs. When the impact sensor 316 senses an impact force (S1), a danger signal (impact signal) is output from the sensor to the CPU 301. In the CPU 301 operating for centralized control of the system in the vehicle 336, data processing is performed when the CPU 301 is supplied with the danger signal (S2). The CPU 301 then outputs a signal to the audio processing circuit 305 in the audio device 304 to warn a driver driving the vehicle or a fellow passenger of a danger by a sound through the speaker 307. The CPU 301 also outputs a signal to the control circuit 309 to display a warning about the danger on the display device 308 (S3). In this specification, the combination of the control circuit 309 which outputs signals to the display device 308 and the display device 308 which displays a warning about a danger will be referred to as an alarm device 340.

The distance measuring sensor 317 will next be described with reference to FIG. 8. One or a plurality of distance measuring sensors 317 are provided in one or a plurality of places in the body of the vehicle. Each distance measuring sensor 317 is used to measure the distance to another vehicle existing on the front, rear, left-hand or right-hand side of the vehicle having the sensor. The user can use the distance measuring sensor 317 by operating the operating buttons 302c when necessary.

Figure 8:
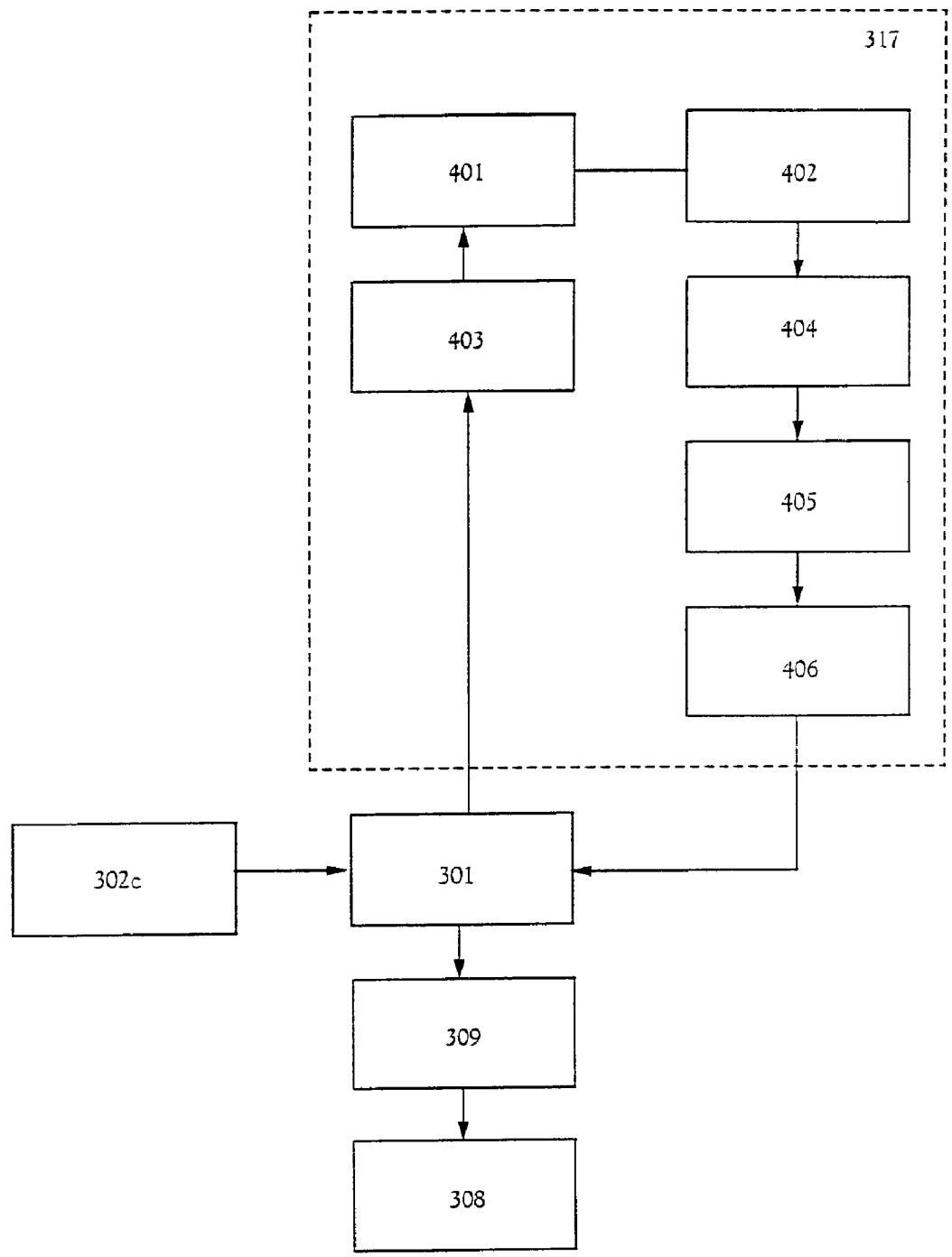
FIG. 8 is a flowchart of a process using a distance measuring sensor of the present invention.

Referring to FIG. 8, a light emitting portion 401 is that of a scanning-type laser. The scanning-type laser moves in a scanning manner a laser beam in synchronization with an output signal produced in a light emitting signal output section 403. The laser beam emitted from one of the distance measuring sensors 317 provided in suitable portions of the vehicle is reflected by some other vehicle and received through a light receiving portion 402. The received laser beam is supplied to a distance computation section 405 through a received light signal detection section 404. In the distance computation section 405, the distance between the vehicles is computed from the time from the moment at which the laser beam is emitted to the moment at which the laser beam is returned by being reflected.

Information on the distance between the vehicles computed in the distance computation section 405 is output to the CPU 301 through a distance indication output section 406. In the CPU 301, data processing of the supplied information is performed. A signal is output from the CPU 301 to the control circuit 309 to indicate on the display device 308 the distance between the vehicles computed in the distance computation section 405. The CPU 301 is connected to the operating buttons 302c to enable the user to display the information read with the distance measuring sensor 317 on the display device 308 by operating the operating buttons 302c when necessary.

In this embodiment, a scanning-type Laser is used as the light emitting portion 401. However, the present invention is not limited to this, and any other type of laser may alternatively be used.

Figure 9A:
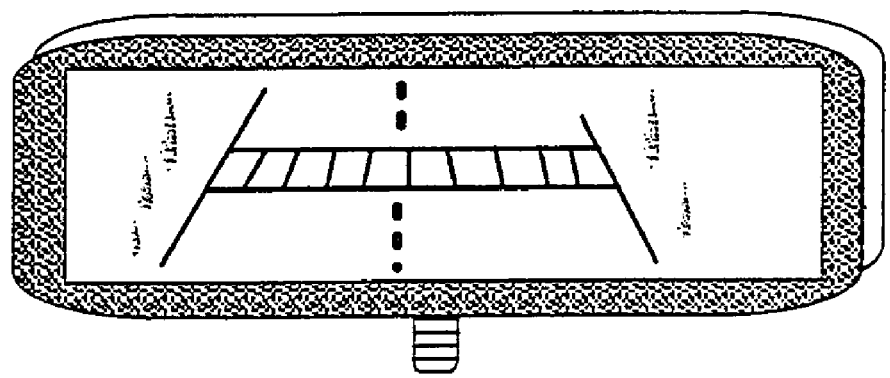
FIGS. 9A, 9B, and 9C are diagrams showing a display device used in accordance with the present invention.
Figure 9B:
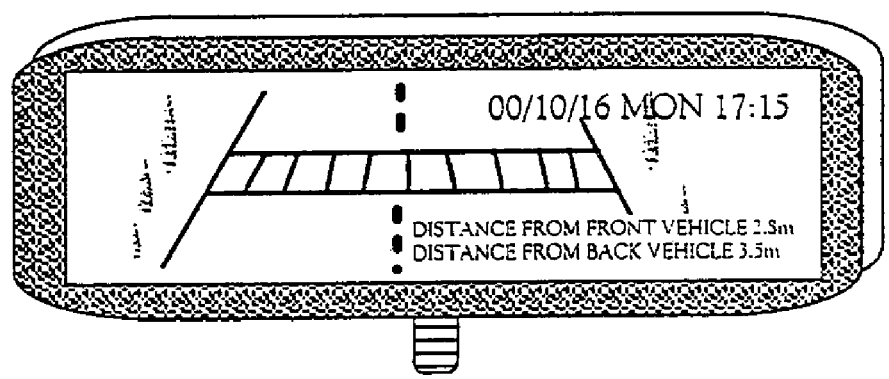
Figure 9C:
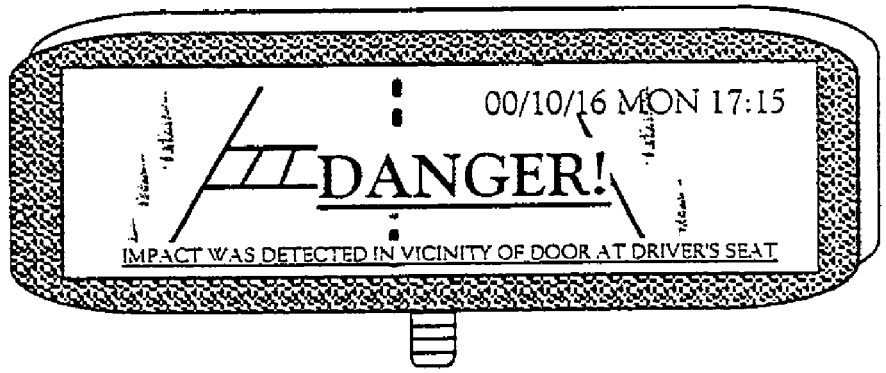

FIGS. 9A, 9B, and 9C are diagrams each showing an example of display of information read from the impact sensor 316 and the distance measuring sensor 317, the information being displayed on the display device provided in the back mirror BD 110.

FIG. 9A shows a state of display of an image from one of the cameras mounted on the vehicle. FIG. 9B shows a state where a date, a time, the distance to a vehicle in front and the distance to a vehicle in back are displayed in addition of an image from the camera mounted on the vehicle. FIG. 9C shows a state where an image from the camera mounted on the vehicle, and a warning given when the impact sensor outputs a detection signal are displayed on the display device.

As described above, information read from the camera, distance measuring sensor and impact sensor mounted on the vehicle is displayed on each of the display devices provided in the side mirror and the back mirror when necessary, thus enabling a driver driving the vehicle or a fellow passenger to obtain necessary information.

[Embodiment 1]

A liquid crystal display device which is an example of the display device provided in the side or back mirror and which represents an embodiment of the present invention will be described.

Figure 10:
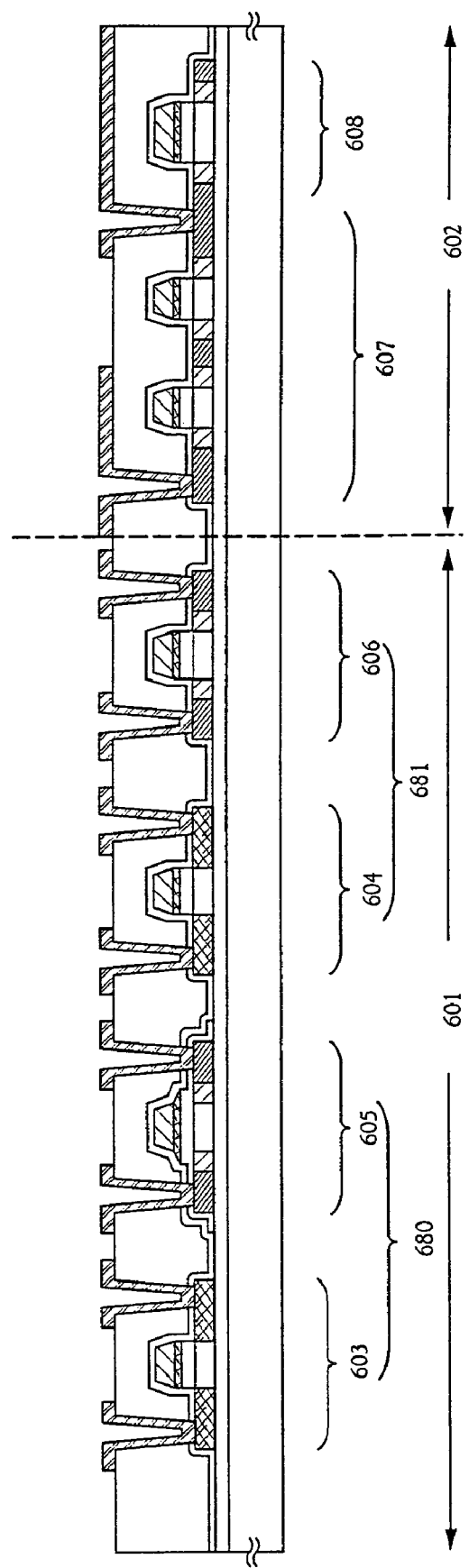
FIG. 10 is a cross-sectional view of an active-matrix liquid crystal display device of Embodiment 1.

FIG. 10 shows an example of a liquid crystal display device having a pixel portion 602 and a drive circuit 601 for driving the pixel portion 602 (in a state before a liquid crystal material is contained).

A complementary metal-oxide-silicon (CMOS) circuit, which is a basic unit of the drive circuit 601, and one pixel in the pixel portion 602 are illustrated.

Referring to FIG. 10, on a substrate are formed the drive circuit 601 including a logic circuit 680 and a sampling circuit 681, which are constituted by n-channel thin-film transistors (TFTs) 605 and 606 and p-channel TFTs 603 and 604, and the pixel portion 602 constituted by a pixel TFT 607, which is an n-channel TFT, and a storage capacitor 608. In this embodiment, each TFT is formed as a top gate type of TFT.

The pixel TFT 607 has a structure (double-gate structure) in which two channel forming regions are provided between a source region and a drain region. In this embodiment, however, the double-gate structure is not exclusively used and a single-gate structure in which one channel forming region is formed or a triple-gate structure in which three channel-forming regions are formed may alternatively be used.

In this embodiment, a pixel electrode connected to the drain region of the pixel TFT 607 is formed as a reflecting electrode. Preferably, the pixel electrode is formed of a member having high reflectivity, e.g., a film of a material having Al or Ag as a main component of laminated films of such materials. Preferably, the formed pixel electrode is processed by an additional well-known sandblasting or etching step to form irregularities in its surface, thereby preventing mirror reflection and scattering reflected light so that the whiteness level is increased.

While the embodiment has been described as a reflection type of liquid crystal display device having the pixel electrode formed as a reflecting electrode, a transmission type of liquid crystal display device may alternatively be used in which the pixel electrode is formed as a transparent electroconductive film instead of the reflecting electrode.

After the progression of the fabrication process to the state shown in FIG. 10, an alignment film is formed over the pixel electrode and undergoes rubbing. In this embodiment, pillar-like spacers for setting a substrate spacing are formed at predetermined positions by patterning an organic resin film such as an acrylic resin film before the formation of the alignment film. Spherical spacers may be provided by being dispersed over the entire substrate surface instead of the pillar-like spacers.

Next, an opposed substrate is prepared. A colored layer and a light shielding layer are formed on the opposed substrate. A leveling film is thereafter formed. Next, a counter electrode formed of a transparent conductive film is formed on the leveling film at least above the pixel portion 602, and an alignment film is formed on the entire surface of the opposed substrate and rubbed.

The stainless substrate on which the pixel portion 602 and the drive circuit 601 are formed and the fixed substrate are attached to each other by an adhesive layer (a layer of a sealing material in this embodiment). A filler is mixed in the material of the adhesive layer. The two substrates are attached to each other by being uniformly spaced apart from each other by the filler and the pillar-like spacers. The gap between the two substrates is thereafter filled with a liquid crystal material and is completely sealed with a sealing material (not shown). The liquid crystal material is not limited to a particular kind and sealing may be made by using any of well-known liquid crystal materials.

After the step of filling the gap with the liquid crystal and sealing the gap (or containing the liquid crystal), the substrate holder is separated. A state of the above-described liquid crystal display device after this step, represented by a state shown in FIG. 11, will next be described.

Figure 11:
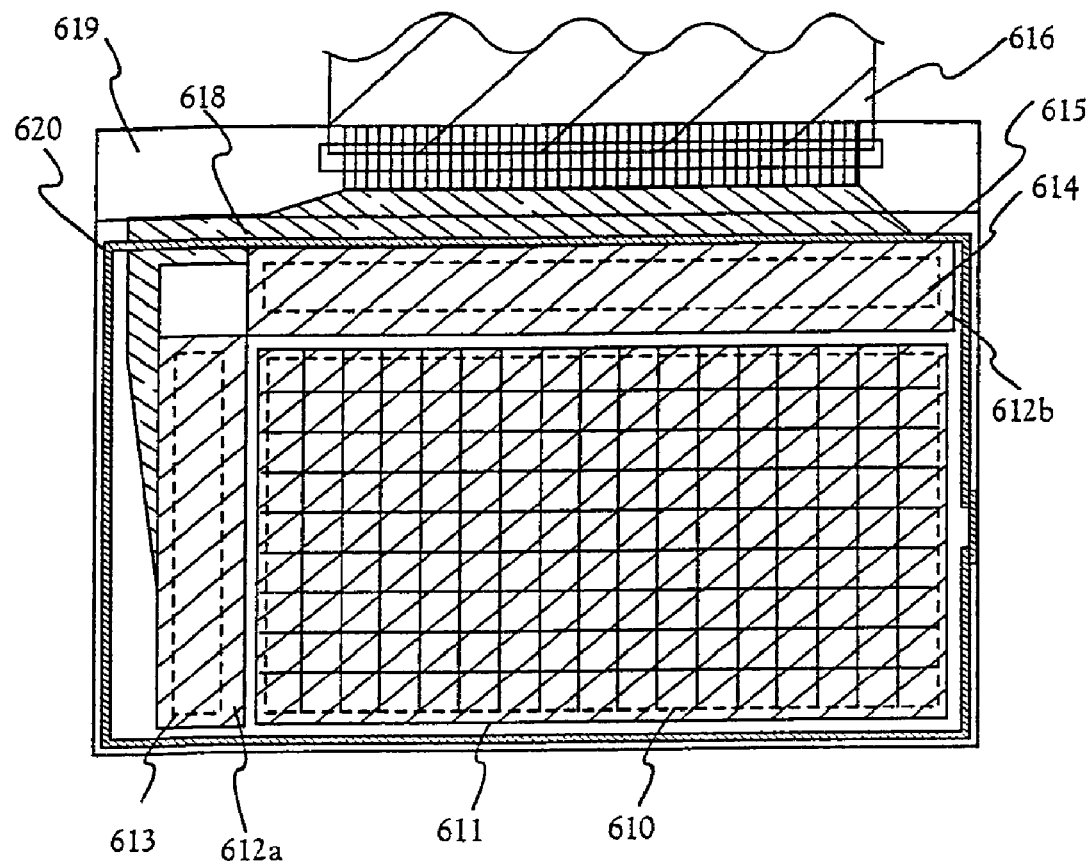
FIG. 11 is a top view of the active-matrix liquid crystal display device of Embodiment 1.

In the state illustrated in the top view of FIG. 11, a stainless substrate 619 on which a pixel portion 610, a drive circuit (a gate signal line drive circuit 613, a source signal line drive circuit 614), an external input terminal to which an FPC 616 is attached, wiring 618 for connecting the external input terminal and input portions of the circuit, etc., are formed and an opposed substrate 620 on which a color filter 611, etc., are formed are attached to each other by a sealing material 615.

A light shielding layer 612a is provided on the opposed substrate 620 side by being superposed on the gate signal line drive circuit 613, and a light shielding layer 612b is also provided on the opposed substrate 620 side by being superposed on the source signal line drive circuit 614. The color filter 611 provided on the opposed substrate 620 side of the pixel portion 610 has colored layers having colors red (R), been (G), and blue (B) formed in correspondence with pixels. In actual color display, a multicolor image is displayed by using the three colors of the red (R) colored layer, the green (G) colored layer and the blue (B) colored layer. The colored layers having these colors may be arrayed in any pattern.

The color filter 611 for colorization is not necessarily provided on the opposed substrate 620. It may be formed on the stainless substrate 619 at the time of device fabrication on the stainless substrate 619.

A light shielding layer is provided between adjacent pixels in the color filter 611 to block light at portions other than the display region. In this embodiment, the light shielding layers 612a and 612b are also provided on the regions covering the drive circuit (the gate signal line drive circuit 613, the source signal line drive circuit 614). However, the liquid crystal display device may be formed without light shielding layers 612a and 612b because the regions covering the drive circuit (the gate signal line drive circuit 613, the source signal line drive circuit 614) are covered with portions of an electronic device when the liquid crystal display device is incorporated as a display unit in the electronic device. Alternatively, light shielding layers may be formed on the stainless substrate 619 when the necessary elements are fabricated on stainless substrate 619.

Further, the arrangement may alternatively be such that the above-described light shielding layers 612a and 612b are not provided but a plurality of colored layers constituting the color filter are laminated at suitable positions between the opposed substrate 620 and the counter electrode to block light at portions (the gaps between the pixel electrodes) other than the display region and at the drive circuit (the gate signal line drive circuit 613, the source signal line drive circuit 614).

The FPC 616 formed of a base film and wiring is attached to the external input terminal by an anisotropic electroconductive resin. This connection is mechanically reinforced by a reinforcing plate.

A polarizing plate (not shown) is attached only to the opposed substrate 620.

The liquid crystal display device fabricated as described above can be used as a display device mounted in the side or back mirror.

Examples of a circuit configuration in the liquid crystal display device in this embodiment will next be described with reference to FIGS. 12A and 12B.

Figure 12A:
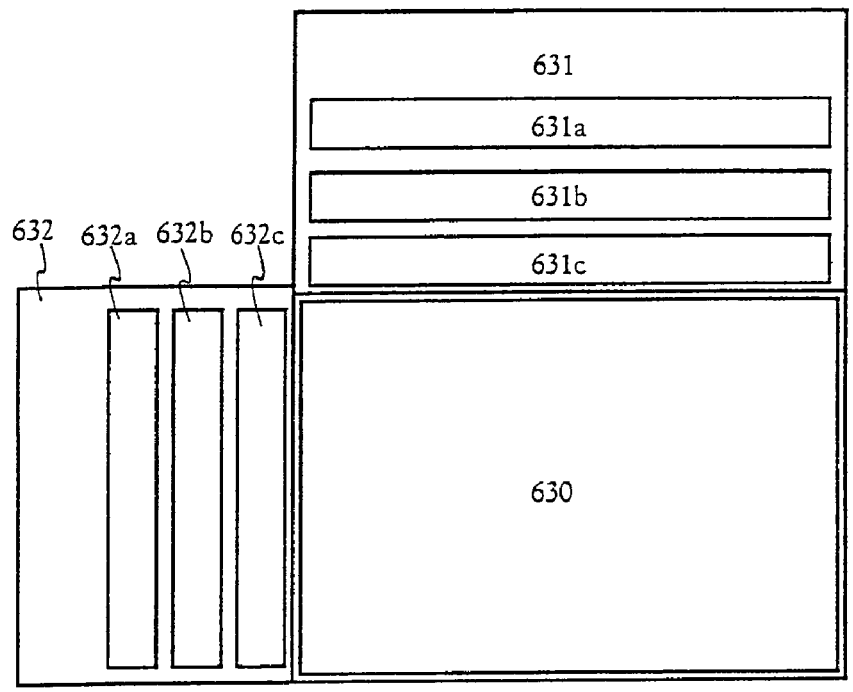
FIGS. 12A and 12B are block diagrams of drive circuits of the active-matrix liquid crystal display devices of Embodiment 1.

FIG. 12A shows a circuit configuration for analog drive having a source line drive circuit 631, a pixel portion 630, and a gate line drive circuit 632.

The source line drive circuit 631 has a shift register 631a, a buffer 631b, a sampling circuit (transfer gate) 631c. The gate line drive circuit 632 has a shift register 632a, a level shifter 632b, and a buffer 632c. A level shifter circuit may be provided between the sampling circuit and the shift register if necessary.

In this embodiment, the pixel portion 630 includes a plurality of pixels each having a TFT device.

All TFT devices provided in the source line drive circuit 631 and the gate line drive circuit 632 may be formed as p-channel TFTs or n-channel TFTs, or may be formed by using a combination of p-channel TFTs and n-channel TFTs.

Another gate line drive circuit (not shown) may also be provided on the side of the pixel portion 630 remote from the gate line drive circuit 632.

Figure 12B:
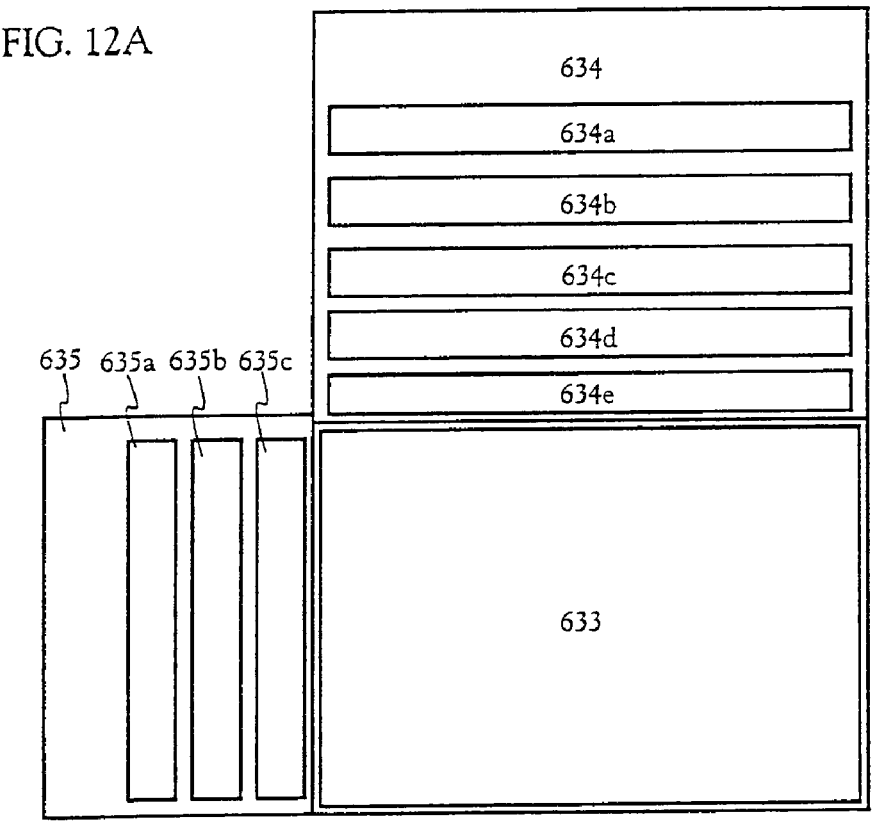

If digital drive is performed, latches (A) 634b and 634c may be provided instead of the sampling circuit, as shown in FIG. 12B. A source line drive circuit 634 has a shift register 634a, a latch (A) 634b, a latch (B) 634c, a D/A converter 634d, and a buffer 634e. A gate line drive circuit 635 has a shift register 635a, a level shifter 635b, and a buffer 635c. A level shifter circuit may be provided between the latch (B) 634c and the D/A converter 634d.

Although only the configurations of the pixel portion and the drive circuit have been described with respect to this embodiment, a memory and a microprocessor may also be formed.

This embodiment may be arranged in combination with any of the above-described features in the mode of implementation of the invention.

[Embodiment 2]

Figure 13A:
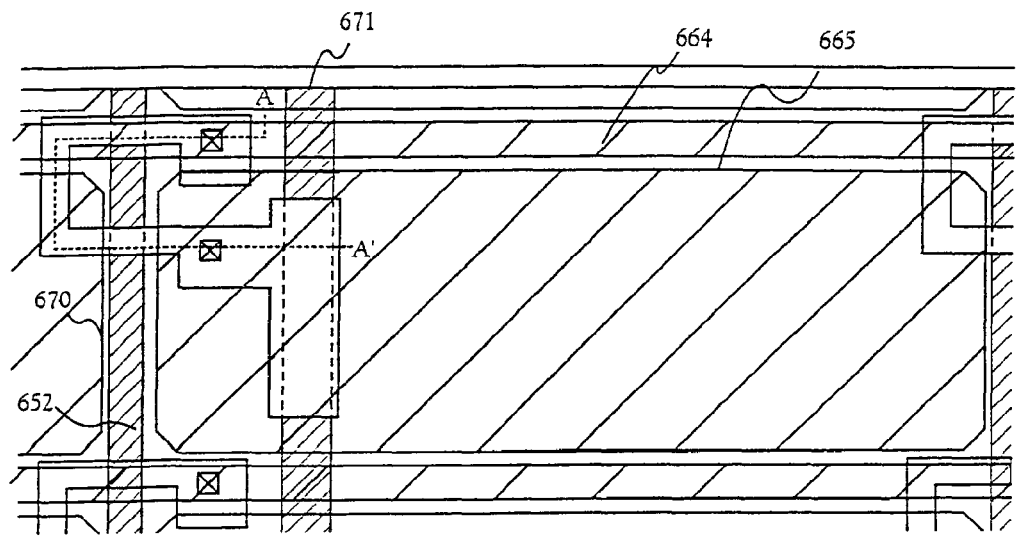
FIGS. 13A and 13B are a top view and a cross-sectional view, respectively, of the active-matrix liquid crystal display device of Embodiment 2.
Figure 13B:
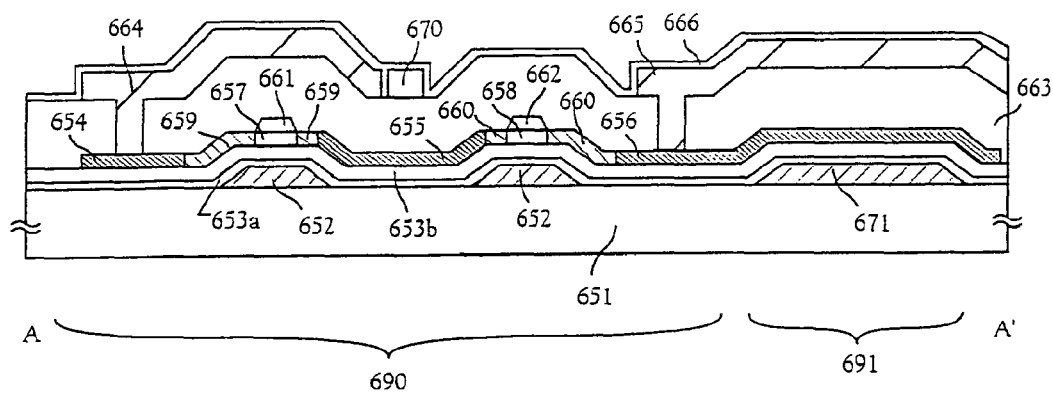

A second embodiment of the present invention in which each of TFTs used in the pixel portion and the drive circuit of a liquid crystal display device provided as a display device mounted in the side or back mirror is formed as an inverted stagger type of TFT will be described with reference to FIGS. 13A and 13B. FIG. 13A is an enlarged top view of one of pixels in the pixel portion. A portion taken along a dotted line A-A' in FIG. 13A corresponds to the sectional view of the structure of the pixel portion in FIG. 13B. A member 651 illustrated in FIG. 13B is a substrate having an insulating surface.

In the pixel portion, each of pixel TFTs 690 is formed as an n-channel TFT. A gate electrode 652 is formed on the substrate 651. A first insulating film 653a formed of silicon nitride and a second insulating film 653b formed of silicon oxide are formed on the gate electrode 652 and the substrate 651. On the second insulating film 653b are formed, as regions in an active layer, $n^+$ regions 654 to 656, channel forming regions 657 and 658, and $n^-$ regions 659 and 660. The $n^-$ regions 659 and 660 are formed among the $n^+$ regions 654 to 656 and the channel forming regions 657 and 658. The channel forming regions 657 and 658 are protected by insulating layers 661 and 662. Contact holes are formed in a first interlayer insulating film 663 with which the insulating layers 661 and 662 and the active layer are covered. After the formation of the contact holes, wiring 664 connected to the $n^+$ region 654 is formed, a pixel electrode 665 made of Al or Ag is connected to the $n^+$ region 656, and a passivation film 666 is formed thereon. Reference numeral 670 is a pixel electrode adjacent to the pixel electrode 669.

In this embodiment, the gate wiring to the pixel TFT in the pixel portion is formed in the double-gate structure. However, a multigate structure such as a triple-gate structure may alternatively be used in order to reduce variation in off current. Further, a single gate structure may be used to increase the aperture ratio.

The capacitor portion 691 in the pixel portion is formed by capacitor wiring 671 and the $n^+$ region 656 with the first insulating film 653a and the second insulating film 653b used as a dielectric.

The pixel portion shown in FIGS. 13A and 13B is only an example and the present invention is not limited to the above-described arrangement.

The liquid crystal display device fabricated as described above can be used as a display device mounted in the side or back mirror in accordance with the present invention.

This embodiment may be arranged in combination with any of the above-described features of Embodiment 1.

[Embodiment 3]

A third embodiment of the present invention in which an electroluminescent (EL) display device is provided as a display device mounted in the side or back mirror of a vehicle will be described.

Figure 14:
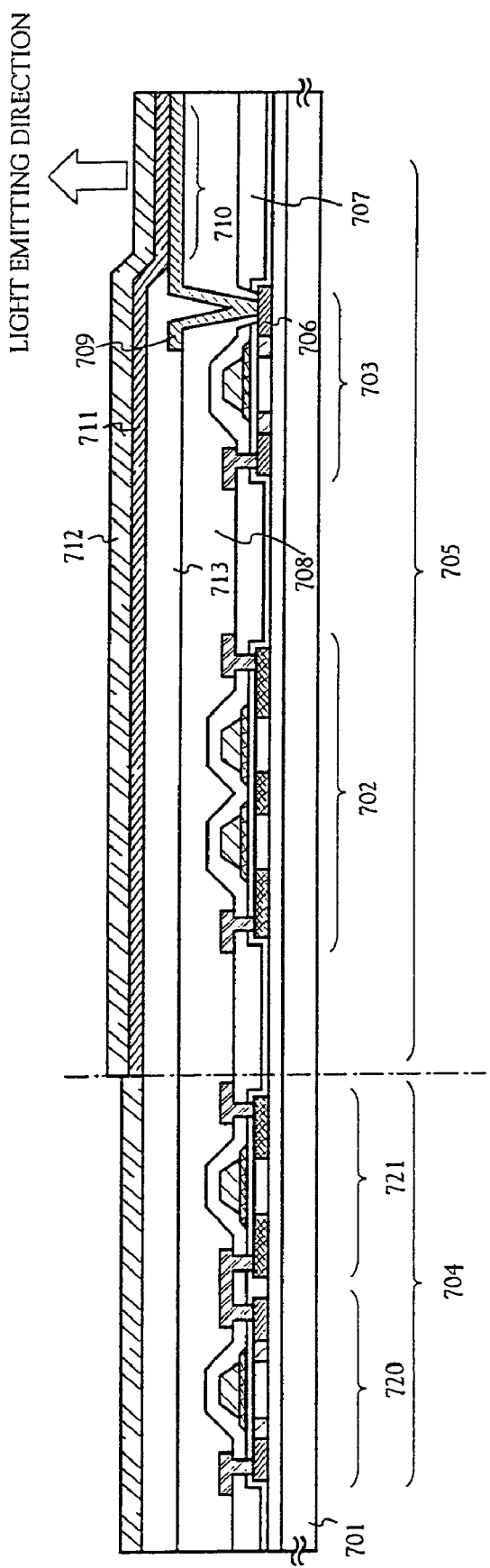
FIG. 14 is a cross-sectional view of an EL display device of Embodiment 3.

FIG. 14 shows an example of a light emitting device in which a pixel portion 705 and a drive circuit 704 for driving the pixel portion 705 are provided on one substrate (and which is in a state before sealing). A CMOS circuit which is a basic unit in the drive circuit 704 is illustrated.

Referring to FIG. 14, a member 701 is a substrate on which an insulating film is formed. The CMOS of the drive circuit 704 constituted by an n-channel TFT 720 and a p-channel TFT 721 is formed on the insulating film. A switching TFT 702, which is a p-channel TFT, and a current control TFT 703, which is an n-channel TFT, are also formed on the insulating film. In this embodiment, each TFT is formed as a top gate type of TFT. However, the present invention is not limited to this.

The switching TFT 702 has a structure (double-gate structure) in which two channel forming regions are provided between a source region and a drain region. In this embodiment, however, the double-gate structure is not exclusively used and a single-gate structure in which one channel forming region is formed or a triple-gate structure in which three channel-forming regions are formed may alternatively be used.

A contact hole is formed in a first interlayer insulating film 707 above a drain region 706 of the current control TFT 703 before a second interlayer insulating film 708 is formed. This procedure is adopted to simplify an etching process when a contact hole is formed in the second interlayer insulating film 708. The contact hole is formed in a second interlayer insulating film 708 so as to extend to the drain region 706, and a pixel electrode 709 is formed so as to connect to the drain region 706 of the current control TFT 703. The pixel electrode 709 is an electrode which functions as a cathode of an EL element 710, and which is formed by using a conductive film containing an element which belongs to the group 1 or 2 in the periodic table. In this embodiment, a conductive film formed of a compound of lithium and aluminum.

An insulating film 713 is formed so as to cover an end portion of the pixel electrode 709. The insulating film 713 will be referred to as "bank" in this specification. The bank 713 may be formed of an insulating film containing silicon or a resin film. If a resin film is used, carbon particles or metal particles may be added so that the resistivity of the resin film is $1\times10^6$ to $1\times10^{12}$ Ωm (preferably $1\times10^8$ to $1\times10^{10}$ Ωm), thereby reducing the possibility of insulation breakdown at the time of film forming.

The EL element 710 is constituted by the pixel electrode (cathode) 709, an EL layer 711, and an anode 712. To form the anode 712, a conductive film having a high work function, typically an oxide conductive film is used. As an oxide conductive film, indium oxide, tin oxide, zinc oxide or a component of such oxides may be used. The light emitting device in this embodiment is formed as an upward emission type of light emitting device. However, this embodiment is not limited to the upward emission type of light emitting device, and a downward emission type of light emitting device can be formed by suitably changing the structure of the EL element.

In this embodiment, an EL layer 711 is defined as a laminated member having a combination of a light emitting layer and a hole injection layer, a hole transport layer, hole block layer, an electron transport layer, an electron injection layer or an electron block layer.

Any of well-known EL materials may be used to form the light emitting layer. For example, a thin film of a light emitting material capable of emitting light by singlet excitation (singlet compound) or a thin film of a light emitting material capable of emitting light by triplet excitation (triplet compound) is used.

A method (not illustrated) may be effectively used in which, after the formation of anode 712, a passivation film is formed so as to completely cover the EL element 710. The passivation film may be an insulating film comprising a carbon film, a silicon nitride film or a silicon nitride oxide film, or may be a single layer of such an insulating film or a layer formed by laminating a combination of such films.

The fabrication process includes, as a final step, the step of sealing (encapsulation) for protection of the EL element are performed. The EL display device after sealing will be described with reference to FIGS. 15A and 15B.

Figure 15A:
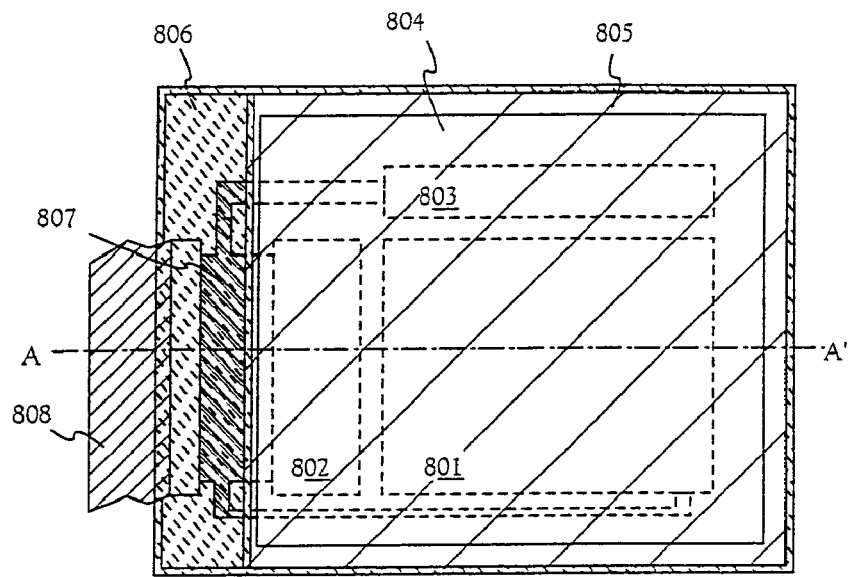
FIGS. 15A and 15B are a top view and a cross-sectional view, respectively, of the EL display device of Embodiment 3.
Figure 15B:
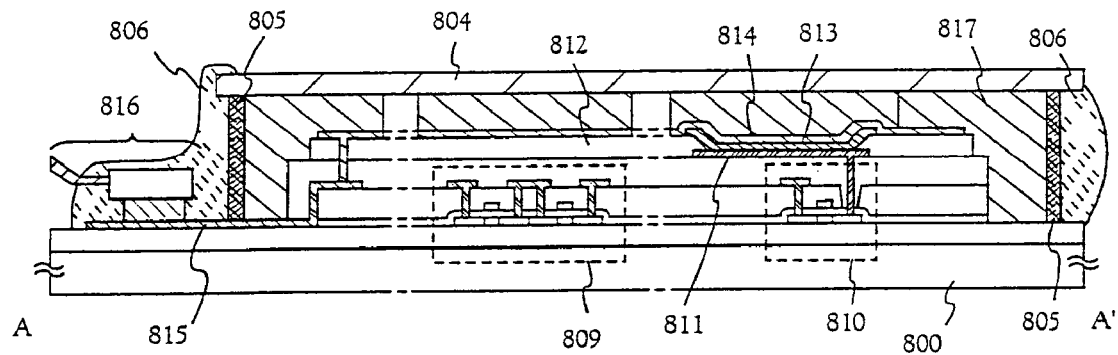

FIG. 15A is a top view when the step of sealing the EL element is completed, and FIG. 15B is a cross-sectional view taken along line A-A' in FIG. 15A. A region 801 indicated by a dotted line corresponds to a pixel portion, a region 802 corresponds to a source line drive circuit, and a region 803 corresponds to a gate line drive circuit. A cover member 804, a first sealing material 805, and a second sealing material 806 are provided.

An FPC 808 is a wiring for transmitting signals to be input to the source line drive circuit 802 and the gate line drive circuit 803. In other words, the source line drive circuit 802 and the gate line drive circuit 803 are supplied with a video signal and a clock signal through the FPC 808 corresponding to an external input terminal. A printed wiring base (PWB) may be attached to the FPC 808 although only the FPC 808 is illustrated.

The structure of the display device will be described with reference to the cross-sectional view of FIG. 15B. The pixel portion and a source line drive circuit 809 are formed above a substrate 800. The pixel portion is formed by a plurality of pixels each including a current control TFT 810 and a pixel electrode 811 electrically connected to the drain of the current control TFT 810. The source line drive circuit 809 is formed by using a CMOS circuit comprising a combination of n-channel TFTs and p-channel TFTs. A polarizing plate (typically a circularly polarizing plate) may be attached to the substrate 800.

Banks 812 are formed on opposite ends of the pixel electrode 811, and an EL layer 813 and art anode 814 of the EL element are formed on the pixel electrode 811. The anode 814 also functions as a common wiring for all the pixels and is electrically connected to the FPC 816 by connection wiring 815. All the elements included in the pixel portion and the source-side drive circuit 809 are covered with a passivation film (not shown).

The cover member 804 is attached by the first sealing material 805. Spacers may be provided for spacing between the cover member 804 and the EL device. A space 817 is formed inside the first sealing material 805. It is preferred chat the first sealing material 805 be impermeable to water and oxygen. Further, it is effective to provide in the space 817 a material having a hygroscopic effect and/or a material having an anti-oxidizing effect.

Preferably, a carbon film (specifically, a diamond-like carbon film) having a thickness of about 2 to 30 nm may be formed as a protective film on each of the outer and inner surfaces of the cover member 804. Such a carbon film (not shown) has the functions of preventing oxygen and water from entering the display device and mechanically protecting the surface of the cover member 804.

After bonding of the cover member 804, the second sealing material 806 is provided so as to cover the exposed surface of the first sealing material 805. The same material as the first sealing material 805 may be used as second sealing material 806.

The EL device is encapsulated in the above-described structure to be completely shielded from the outside, thereby preventing substances such water and oxygen capable of degrading the EL layer by oxidation from entering the device. Thus, an EL display device having improved reliability can be obtained.

The EL display device fabricated as described above can be used as a display device mounted in the side or back mirror in accordance with the present invention. This embodiment may be arranged in combination with any of the above-described features of Embodiments 1 and 2.

[Embodiment 4]

An embodiment of the present invention represented by a back mirror or a side mirror of a construction different from that in the above-described mode of implementation of the invention will be described with reference to FIGS. 16A-16D and 17A-17B. FIGS. 16A-16D and 17A-17B show examples of the back mirror BD 110.

Figure 16A:
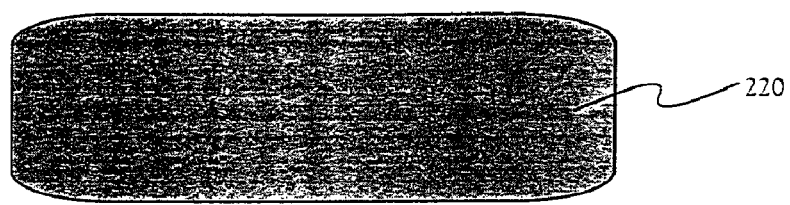
FIGS. 16A, 16B, 16C, and 16D are diagrams showing an example of the back mirror of the vehicle in accordance with Embodiment 4.
Figure 16B:
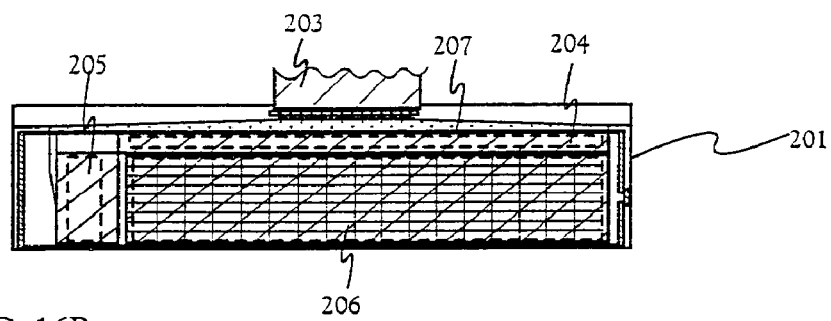
Figure 16C:
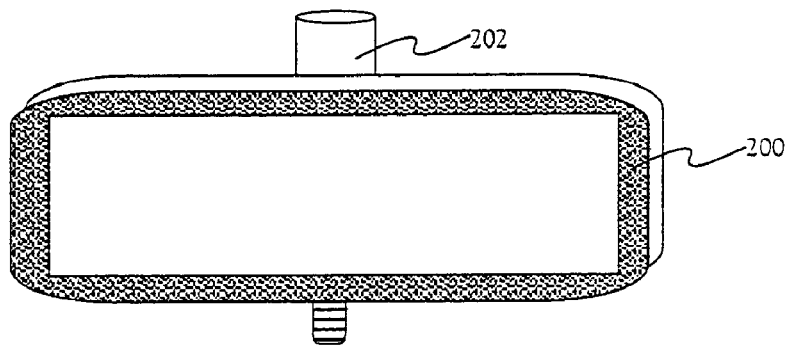

FIGS. 16A to 16D are enlarged diagram of the back mirror BD 110 mounted on the vehicle shown in FIG. 2. FIG. 16A shows a mirror 220, and FIG. 16B shows the display device 201. FIG. 16C shows the frame 200. The frame 200 is made of a material such as a plastic easily workable and has a cavity.

Figure 16D:
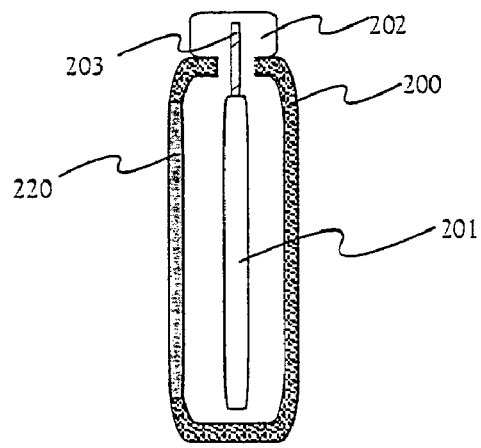

FIG. 16D is a cross-sectional view seen along a lengthwise direction of the back mirror BD 110. The mirror 220 and the display device 201 are placed in the frame 200, the mirror being superposed on the display device and positioned externally relative to the display device. The FPC 203 of the display device 201 is connected via the connecting portion 202 to the CPU provided in the vehicle.

The mirror 220 is a mirror called a one-way mirror or half mirror, i.e., a mirror having a glass plate on which a thin film of a metal is formed and another glass place superposed on the metal film. That is, an object on the light side can be seen through the mirror from the dark side, while no object at the back of the mirror can be seen through the mirror from the light side. That is, when the display device 201 is not activated, the BD 110 functions as a mirror. When the display device 201 is activated, a user can recognize a display on the display device 201 through the mirror 220.

Other examples of the back mirror BD 110 each different in construction from that shown in FIGS. 16A to 16D will be described with reference to FIGS. 17A and 17B.

Figure 17A:
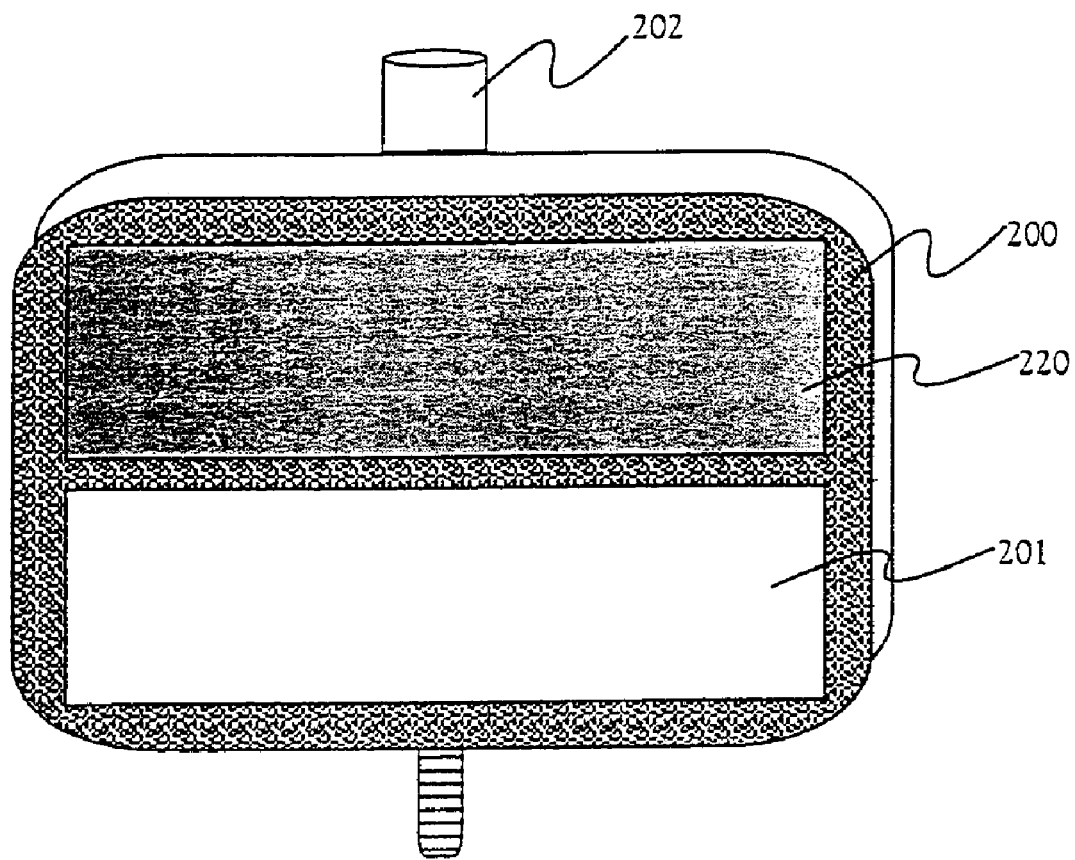
FIGS. 17A and 17B are diagrams showing an example of the back mirror of the vehicle in accordance with Embodiment 4.

The size of the BD 110 shown in FIG. 17A is about twice that of the BD 110 shown in FIG. 16C. While the mirror 220 and the display device 201 are superposed in the arrangement shown in FIGS. 16A to 16D, the display device 201 shown in FIG. 17A is placed parallel to the mirror 220.

The size of the BD 110 is not specially limited and may be freely selected in designing by a designer.

Figure 17B:
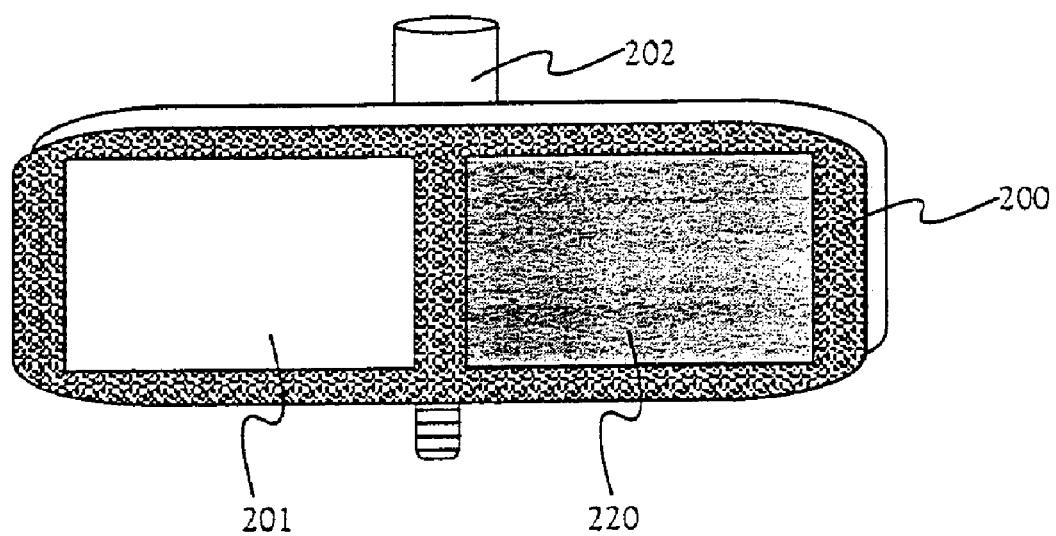

The size of the BD 110 shown in FIG. 17B is approximately the same as that of the BD 110 shown in FIG. 16C. In the arrangement shown in FIG. 17B, however, the display device 201 and the mirror 220 each approximately half the sire of the display device or mirror shown in FIG. 16C or 16A are placed parallel in a side by side fashion. The mirrors shown in FIGS. 17A and 17B may be of any type not limited to the half mirror in the arrangement shown in FIGS. 16A to 16D as long as they function as a mirror.

This embodiment may be arranged in combination with any of the above-described features of Embodiments 1 to 3.

[Embodiment 5]

An example of provision of the display device in the back or side mirror has been described with respect to the mode of implementation. An embodiment of the present invention in which the display device is provided in an interior portion of the vehicle will be described with reference to FIG. 19.

Figure 19:
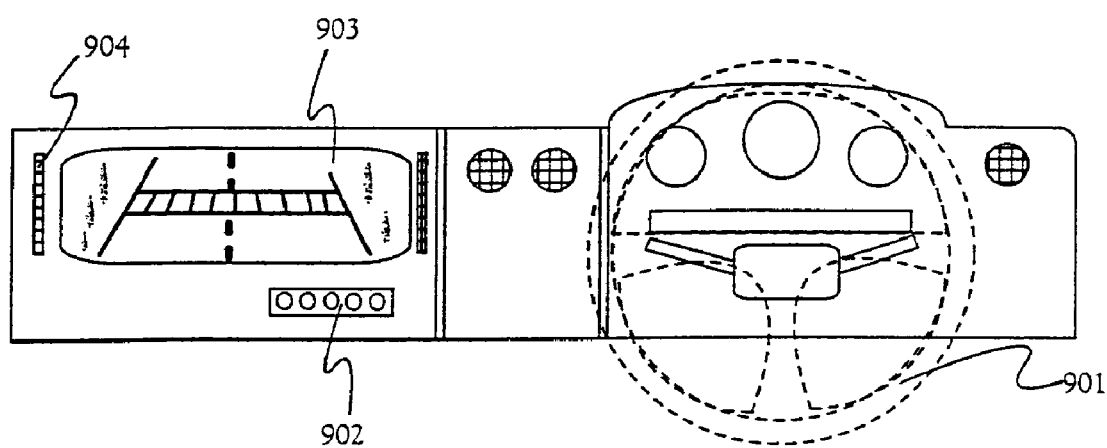
FIG. 19 is a diagram showing a display device provided in an interior portion of the vehicle of Embodiment 5.

FIG. 19 shows the interior of a vehicle in the vicinity of the driver's seat and the fellow passenger's seat. A steeling wheel 901, operating buttons 902, a display device 903, and a speaker 904 are illustrated in FIG. 19 by way of example. A driver who drives the vehicle operates the steeling wheel 901.

A user uses the operating buttons 902 when operating a sensor or a camera. The speaker 904 can be used as an audio device.

Information read from the camera and sensor is displayed on the display device 903 to enable the driver and the fellow passenger in the vehicle to obtain necessary information.

The display device shown in FIG. 19 is placed in the vicinity of the driver's seat. However, the present invention is not limited to this. For example, the display device may be provided on the driver's seat or the fellow passenger's seat to be easily viewed by a passenger sitting in a rear seat. The placement of the operating buttons 902 and that of the speaker 904 in this embodiment are only an example and the operating buttons 902 and the speaker 904 may be mounted in any other places in the vehicle. The operating buttons 902 may be provided in a remote controller.

This embodiment may be arranged in combination with any of the above-described features of Embodiments 1 to 4.

[Embodiment 6]

The display device of the present invention is used for various purposes. An embodiment of the present invention relating applications of vehicles in which the display device of the present invention is incorporated will be described with reference to FIGS. 18A to 18D.

The mode of implementation of the invention has been described with respect to a vehicle for transport of a small number of passengers by way of example. However, vehicles to which the present invention can be applied include motor vehicles, such as sport cars, trucks, buses, station wagons, special-purpose vehicles (ambulance cars, etc.), special-type vehicles (tractors, etc.), specially-equipped vehicles (tank trucks, etc.), electric train, cars, and motorcycles. FIGS. 18A to 18D show examples of such vehicles.

Figure 18A:
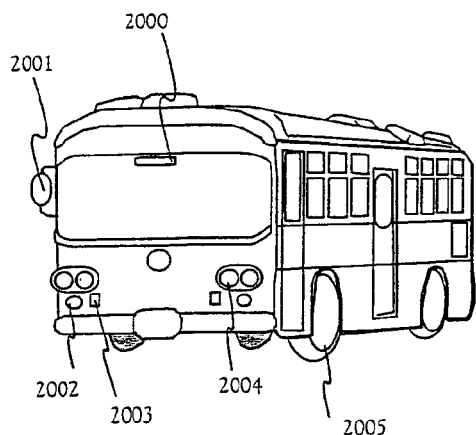
FIGS. 18A, 18B, 18C, and 18D are diagrams showing examples of vehicles to which the present invention can be applied of Embodiment 6.

FIG. 18A illustrates a bus for transport of a large number of passengers. The bus has a side mirror 2001, a back mirror 2000, a camera 2002, a sensor 2003, and lights 2004. The bus also has wheels 2005 and travels on a road by the wheels 2005. The display device of the present invention can be mounted in each of the side mirror 2001 and the back mirror 2000.

Figure 18B:
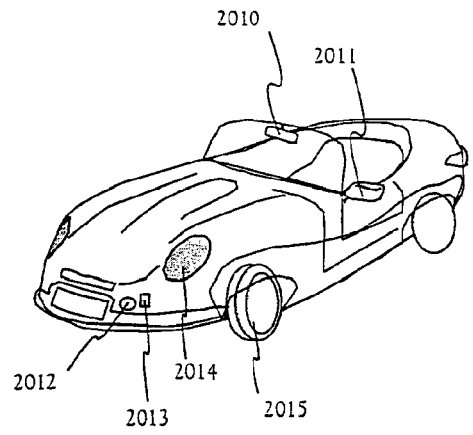

FIG. 18B illustrates a sport car for enjoying sport driving. The passenger capacity of the sport car is ordinary two and at most four. The sport car has a back mirror 2010, a side mirror 2011, a camera 2012, a sensor 2013, and lights 2014. The sport car also has wheels 2015 and uses the wheels 2015 when traveling on a road. The display device of the present invention can be mounted in each of the back mirror 2010 and the side mirror 2011.

Figure 18C:
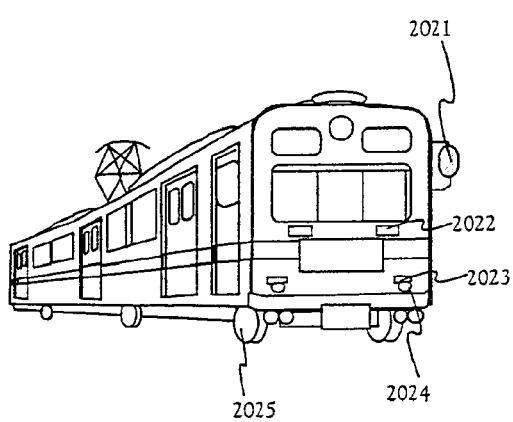

FIG. 18C illustrates an electric train car having a side mirror 2021, a camera 2022, a sensor 2023, and lights 2024. The car also has wheels 2025 and uses the wheels 2025 when traveling on rails. The display device of the present invention can be mounted in the side mirror 2021.

Figure 18D:
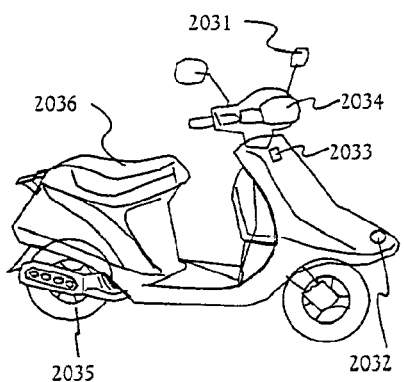

FIG. 18D illustrates a motorcycle having a side mirror 2031, a camera 2032, a sensor 2033, and a light 2034. The motorcycle also has wheels 2035 and uses the wheels 2025 when traveling on a road. The display device of the present invention can be mounted in the side mirror 2031.

As described above, the range of application of the present invention is markedly wide and the invention can be applied to all kinds of vehicles. Further, this embodiment may be arranged in combination with any of the above-described features of Embodiments 1 to 5.

According to the present invention, the display device is mounted in a side mirror (door mirror) and a back mirror (room mirror) provided on a vehicle, or in an interior portion of the vehicle. The display device displays an image of any of objects surrounding the vehicle, which is obtained by a camera provided on the vehicle. The field of view obtained through the side or back mirror can be increased thereby. Also, information obtained through the sensor mounted on the vehicle is displayed on the display device, and the user of the display device can display the information according to user's need.

The vehicle in accordance with the present invention is provided with an alarm device which is constituted by an audio device and a display device. When an impact sensor outputs a danger signal, an indication of a danger is provided on the display device and a warning of the danger is given through the audio device.

As described above, the display device is provided in side and back mirrors or in an interior portion of a vehicle to enable a driver and a fellow passenger to obtain necessary information at any time.

What is claimed is:

1. A device comprising:
   a mirror adapted to be mounted to a body of a vehicle;
   a display device mounted in the mirror, the display device comprising:
   a substrate,
   a first thin film transistor formed over the substrate,
   a pixel electrode electrically connected to the first thin film transistor,
   a light emitting layer adjacent to the pixel electrode,
   a second electrode adjacent to the light emitting layer wherein the light emitting layer is disposed between the pixel electrode and the second electrode, and
   a cover member covering the second electrode and fixed to the substrate by a sealing material; and
   a camera operationally connected to the display device,
   wherein the display device is configured to display information read from the camera, and wherein the display device is configured to emit light from the light emitting layer through the cover member.

2. The device according to claim 1 wherein the camera comprises a CCD camera.

3. The device according to claim 1 wherein the mirror is a side mirror.

4. The device according to claim 1 wherein the mirror is a back mirror.

5. The device according to claim 1 further comprising a driver circuit comprising a second thin film transistor formed over the substrate and operationally connected to the first thin film transistor.

6. The device according to claim 1 further comprising a central processing unit and a video signal processing section in the central processing unit, said video signal processing section being configured to be supplied with information read by the camera.

7. The device according to claim 1 wherein the second electrode is an anode.

8. A device comprising:
   a mirror adapted to be mounted to a body of a vehicle;
   a display device mounted in the mirror, wherein the display device comprises:
   a substrate,
   a first thin film transistor formed over the substrate,
   a pixel electrode electrically connected to the first thin film transistor,
   a light emitting layer adjacent to the pixel electrode,
   a second electrode adjacent to the light emitting layer wherein the light emitting layer is disposed between the pixel electrode and the second electrode, and
   a cover member covering the second electrode and fixed to the substrate by a sealing material; and
   a sensor for measuring a distance to another vehicle, the sensor being operationally connected to the display device; and
   wherein the display device is configured to emit light from the light emitting layer through the cover member, and
   wherein the display device is configured to display information based on information obtained by the sensor.

9. The device according to claim 8 wherein the mirror is a side mirror.

10. The device according to claim 8 wherein the mirror is a back mirror.

11. The device according to claim 8 further comprising a driver circuit comprising a second thin film transistor formed over the substrate and operationally connected to the first thin film transistor.

12. The device according to claim 8 further comprising a central processing unit and a video signal processing section in the central processing unit, said video signal processing section being configured to be supplied with information read by the sensor.

13. The device according to claim 8 wherein the second electrode is an anode.

14. A device comprising:
   a mirror adapted to be mounted to a body of a vehicle;
   a display device mounted in the mirror, wherein the display device comprises:
   a substrate,
   a first thin film transistor formed over the substrate,
   a pixel electrode electrically connected to the first thin film transistor,
   a light emitting layer adjacent to the pixel electrode,
   a second electrode adjacent to the light emitting layer wherein the light emitting layer is disposed between the pixel electrode and the second electrode, and
   a cover member covering the second electrode and fixed to the substrate by a sealing material; and
   a sensor for sensing an impact, the sensor being operationally connected to the display device; and
   wherein the display device is configured to emit light from the light emitting layer through the cover member, and
   wherein the display device is configured to display information based on information obtained by the sensor.

15. The device according to claim 14 wherein the mirror is a side mirror.

16. The device according to claim 14 wherein the mirror is a back mirror.

17. The device according to claim 14 further comprising a driver circuit comprising a second thin film transistor formed over the substrate and operationally connected to the first thin film transistor.

18. The device according to claim 14 further comprising a central processing unit and a video signal processing section in the central processing unit, said video signal processing section being configured to be supplied with information read by the sensor.

19. The device according to claim 14 wherein the second electrode is an anode.

* * * * *

UNITED STATES PATENT AND TRADEMARK OFFICE
CERTIFICATE OF CORRECTION

| | | |
|---|---|---|
| PATENT NO. | : 8,193,925 B2 | Page 1 of 1 |
| APPLICATION NO. | : 13/204779 | |
| DATED | : June 5, 2012 | |
| INVENTOR(S) | : Shunpei Yamazaki | |

It is certified that error appears in the above-identified patent and that said Letters Patent is hereby corrected as shown below:

Column 3, line 48, replace "our" with --four--;

Column 4, line 5, replace "tong" with --long--;

Column 4, line 59, replace "linedrive" with --line drive--;

Column 5, line 14, replace "dare" with --date--;

Column 8, line 63, replace "been" with --green--;

Column 9, line 13, replace "tine" with --line--;

Column 12, line 35, replace "art" with --an--;

Column 12, line 46, replace "ehat" with --that--;

Column 13, line 28, replace "place" with --plate--;

Column 13, line 50, replace "sire" with --size--.

Signed and Sealed this
Eighteenth Day of December, 2012

David J. Kappos
*Director of the United States Patent and Trademark Office*